US012693671B2

(12) United States Patent
Jacka et al.

(10) Patent No.: US 12,693,671 B2
(45) Date of Patent: Jul. 28, 2026

(54) METHODS AND SYSTEMS FOR AERIAL VEHICLE ROUTING BASED ON OPTIMAL NETWORK CONNECTIONS

(71) Applicant: T-Mobile Innovations LLC, Overland Park, KS (US)

(72) Inventors: Scott Jacka, Seattle, WA (US); Sean Murphy, Renton, WA (US); George Schnellbacher, Overland Park, KS (US); Joao Teixeira, Shawnee, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 8 days.

(21) Appl. No.: 18/815,608

(22) Filed: Aug. 26, 2024

(65) Prior Publication Data

US 2026/0056542 A1      Feb. 26, 2026

(51) Int. Cl.
| | |
|---|---|
| G05D 1/222 | (2024.01) |
| G05D 1/229 | (2024.01) |
| H04B 7/185 | (2006.01) |
| H04B 17/318 | (2015.01) |
| G05D 109/20 | (2024.01) |

(52) U.S. Cl.
CPC ........... G05D 1/222 (2024.01); G05D 1/2295 (2024.01); H04B 7/18504 (2013.01); H04B 17/318 (2015.01); G05D 2109/20 (2024.01)

(58) Field of Classification Search
CPC .......................... G05D 2109/20; H04B 17/318
See application file for complete search history.

(56) References Cited

U.S. PATENT DOCUMENTS

| | | | |
|---|---|---|---|
| 9,866,313 B1 | 1/2018 | Murphy | |
| 10,020,872 B2 | 7/2018 | Murphy | |
| 10,080,171 B2 | 9/2018 | Murphy | |
| 10,431,103 B2 | 10/2019 | Murphy | |
| 11,166,175 B2 | 11/2021 | Murphy | |
| 11,212,728 B2 | 12/2021 | Murphy | |
| 11,239,903 B2 | 2/2022 | Perlow et al. | |
| 11,757,524 B2 | 9/2023 | Perlow et al. | |
| 2018/0293897 A1* | 10/2018 | Murphy | H04W 24/08 |
| 2019/0174149 A1* | 6/2019 | Zhang | H04N 21/4728 |
| 2019/0281479 A1* | 9/2019 | Althoff | H04W 24/08 |
| 2021/0266212 A1* | 8/2021 | Chae | G01S 5/06 |
| 2022/0094426 A1 | 3/2022 | Perlow et al. | |
| 2022/0148434 A1* | 5/2022 | Vivanco | G08G 5/57 |
| 2023/0147814 A1* | 5/2023 | Carver | G01C 21/20 |
| | | | 701/3 |
| 2023/0379043 A1 | 11/2023 | Perlow et al. | |

* cited by examiner

*Primary Examiner* — Anshul Sood

(57) ABSTRACT

An aerial vehicle system configured to transmit, to a carrier network system, input parameters associated with a requested flight route for an unmanned aerial vehicle, receive signal range data corresponding to a plurality of cell sites based on the input parameters, in which the signal range data for each cell site indicates a three-dimensional distance range within which a signal strength from the cell site is at least a signal strength threshold, and determine one or more flight tunnels for the unmanned aerial vehicle using the signal range data, in which the unmanned aerial vehicle maintains at least the signal strength threshold when the unmanned aerial vehicle flies within the one or more flight tunnels.

20 Claims, 14 Drawing Sheets

300

325

400

500

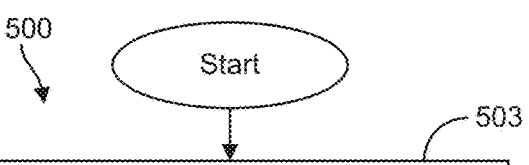

503

Transmitting, by an application of an aerial vehicle system in the communication network, to a carrier network system in the communication network, input parameters associated with a requested flight route for an unmanned aerial vehicle, wherein the input parameters include at least one of a current location of the unmanned aerial vehicle, a destination, one or more waypoints, a location range, an altitude, or a channel

505

Receiving, by the application, signal range data corresponding to a plurality of cell sites based on the input parameters, wherein the signal range data for each cell site indicates a three-dimensional distance range within which a signal strength from the cell site is at least a signal strength threshold, wherein the three-dimensional distance range comprises a latitude range, a longitude range, and an altitude range

507

Determining, by the application, one or more flight tunnels for the unmanned aerial vehicle using the signal range data, wherein each of the one or more flight tunnels indicates a three-dimensional tunnel, wherein the unmanned aerial vehicle maintains at least the signal strength threshold when the unmanned aerial vehicle flies within the one or more flight tunnels

509

Selecting, by the application, a flight tunnel of the one or more flight tunnels based on a signal strength associated with each of the one or more flight tunnels and at least one of airspace regulatory data, ground risk data, terrain data, or weather data

511

Instructing, by the application, the unmanned aerial vehicle to route within the flight tunnel of the one or more flight tunnels to maintain a connection to the carrier network system during flight End

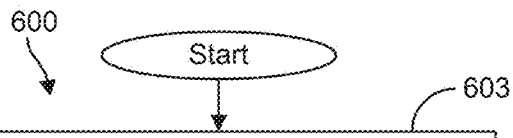

Start

603

Transmitting, by an application of an aerial vehicle system in the communication network, to a carrier network system in the communication network, input parameters associated with a requested flight route for an unmanned aerial vehicle, wherein the input parameters include at least one of a current location of the unmanned aerial vehicle, a destination, one or more waypoints, a location range, an altitude, or a channel

605

Identifying, by a connectivity application of the carrier network system, one or more cell sites based on the input parameters

607

Obtaining, by the connectivity application, signal range data corresponding to each of the one or more cell sites, wherein the signal range data for each of the one or more cell sites indicates a three-dimensional distance range within which a signal strength from a cell site is at least a signal strength threshold, wherein the three-dimensional distance range comprises a latitude range, a longitude range, and an altitude range

609

Transmitting, by the connectivity application, the signal range data corresponding to each of the one or more cell sites to the application of the aerial vehicle system

611

Determining, by the application of the aerial vehicle system, one or more flight tunnels for the unmanned aerial vehicle using the signal range data, wherein each of the one or more flight tunnels indicates a three-dimensional tunnel, wherein the unmanned aerial vehicle maintains at least the signal strength threshold when the unmanned aerial vehicle flies within the one or more flight tunnels

613

Instructing, by the application of the aerial vehicle system, the unmanned aerial vehicle to route within a flight tunnel of the one or more flight tunnels to maintain a connection to the carrier network system during flight

615

Obtaining, by the connectivity application, updated signal range data corresponding to a first cell site of the one or more cell sites, wherein the updated signal range data indicates that the signal strength from the first cell site is less than the signal strength threshold

617

Identifying, by the connectivity application, a second cell site based on the input parameters when the updated signal range data indicates that the signal strength from the first cell site is less than the signal strength threshold and when the first cell site is included in the one or more flight tunnels

619

Transmitting, by the connectivity application, second signal range data corresponding to the second cell site to the application of the aerial vehicle system when the second signal range data indicates that the signal strength from the second cell site is greater than the signal strength threshold End

FIG. 6

METHODS AND SYSTEMS FOR AERIAL VEHICLE ROUTING BASED ON OPTIMAL NETWORK CONNECTIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Unmanned aerial vehicles (UAVs), commonly known as drones, have emerged as versatile tools across various industries and missions. UAVs are utilized in military and defense operations (e.g., reconnaissance, surveillance, etc.) and in the civilian sector. For example, UAVs may be used in agriculture for crop monitoring and spraying, in filmmaking for aerial cinematography, and in infrastructure inspection for assessing bridges, pipelines, and power lines. Additionally, UAVs help disaster response and search and rescue operations by providing real-time aerial imagery and mapping of affected areas. UAVs are also increasingly employed in environmental monitoring, wildlife conservation, and scientific research for tasks, such as, habitat mapping, wildlife tracking, and climate analysis. With advancements in technology and regulatory frameworks, the scope of UAV applications continues to expand, offering innovative solutions across a wide range of industries and missions.

SUMMARY

In an embodiment, a method implemented in a communication network for unmanned aerial vehicle routing based on optimal network connections is disclosed. The method comprises transmitting, by an application of an aerial vehicle system in the communication network, to a carrier network system in the communication network, input parameters associated with a requested flight route for an unmanned aerial vehicle, in which the input parameters include at least one of a current location of the unmanned aerial vehicle, a destination, one or more waypoints, a location range, an altitude, or a channel, identifying, by a connectivity application of the carrier network system, one or more cell sites based on the input parameters, obtaining, by the connectivity application, signal range data corresponding to each of the one or more cell sites, in which the signal range data for each of the one or more cell sites indicates a three-dimensional distance range within which a signal strength from a cell site is at least a signal strength threshold, and the three-dimensional distance range comprises a latitude range, a longitude range, and an altitude range, transmitting, by the connectivity application, the signal range data corresponding to each of the one or more cell sites to the application of the aerial vehicle system, determining, by the application of the aerial vehicle system, one or more flight tunnels for the unmanned aerial vehicle using the signal range data, in which each of the one or more flight tunnels indicates a three-dimensional tunnel, and the unmanned aerial vehicle maintains at least the signal strength threshold when the unmanned aerial vehicle flies within the one or more flight tunnels, instructing, by the application of the aerial vehicle system, the unmanned aerial vehicle to route within a flight tunnel of the one or more flight tunnels to maintain a connection to the carrier network system during flight, and obtaining, by the connectivity application, updated signal range data associated with a first cell site of the one or more cell sites, in which the updated signal range data indicates that the signal strength from the first cell site is less than the signal strength threshold.

In another embodiment, a method implemented in a communication network for unmanned aerial vehicle routing based on optimal network connections is disclosed. The method comprises transmitting, by an application of an aerial vehicle system in the communication network, to a carrier network system in the communication network, input parameters associated with a requested flight route for an unmanned aerial vehicle, in which the input parameters include at least one of a current location of the unmanned aerial vehicle, a destination, one or more waypoints, a location range, an altitude, or a channel, receiving, by the application, signal range data corresponding to a plurality of cell sites based on the input parameters, in which the signal range data for each cell site indicates a three-dimensional distance range within which a signal strength from the cell site is at least a signal strength threshold, and the three-dimensional distance range comprises a latitude range, a longitude range, and an altitude range, determining, by the application, one or more flight tunnels for the unmanned aerial vehicle using the signal range data, in which each of the one or more flight tunnels indicates a three-dimensional tunnel, and the unmanned aerial vehicle maintains at least the signal strength threshold when the unmanned aerial vehicle flies within the one or more flight tunnels, selecting, by the application, a flight tunnel of the one or more flight tunnels based on a signal strength associated with each of the one or more flight tunnels and at least one of airspace regulatory data, ground risk data, terrain data, or weather data, and instructing, by the application, the unmanned aerial vehicle to route within the flight tunnel of the one or more flight tunnels to maintain a connection to the carrier network system network during flight.

In yet another embodiment, an aerial vehicle system is disclosed. The aerial vehicle system comprises a non-transitory memory, a processor coupled to the non-transitory memory, and application stored at the non-transitory memory. The application, which when executed by the processor, causes the processor to be configured to transmit, to a carrier network system in the communication network, input parameters associated with a requested flight route for an unmanned aerial vehicle, receive signal range data corresponding to a plurality of cell sites based on the input parameters, select a flight tunnel for the unmanned aerial vehicle using the signal range data, wherein the flight tunnel indicates a three-dimensional tunnel, wherein the unmanned aerial vehicle maintains at least the signal strength threshold when the unmanned aerial vehicle flies within the flight tunnel, and instruct the unmanned aerial vehicle to route within a flight tunnel of the one or more flight tunnels to maintain connectivity during flight.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a flowchart of a first method of aerial vehicle routing based on optimal network conditions according to various embodiments of the disclosure.

FIG. 6 is a flowchart of a second method of aerial vehicle routing based on optimal network conditions according to various embodiments of the disclosure.

DETAILED DESCRIPTION

Figure 1:
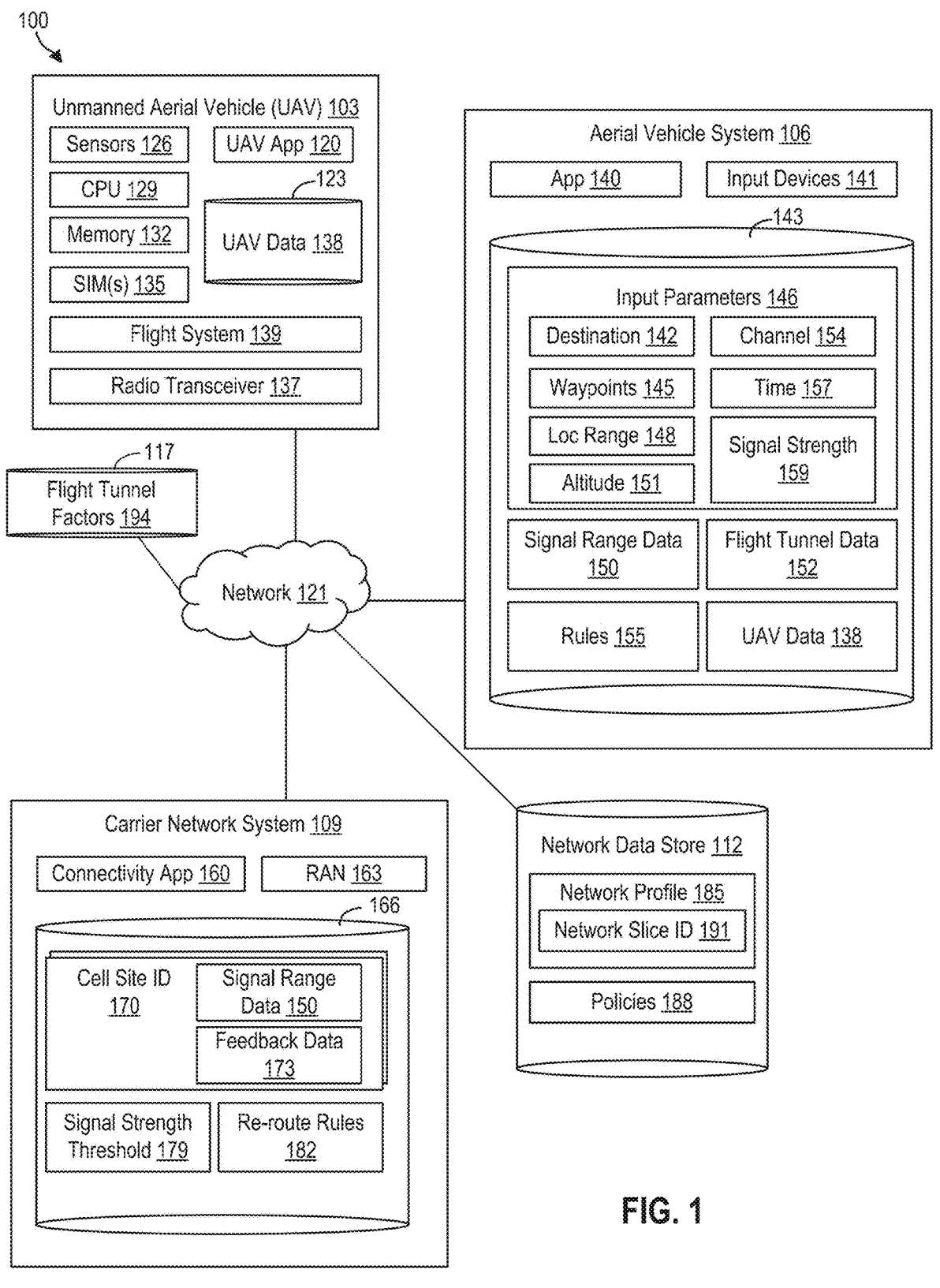
FIG. 1 is a block diagram of a communication network according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, unmanned aerial vehicles (UAVs) may refer to unmanned (e.g., no human pilot onboard) aircraft controlled either autonomously, by onboard computer systems, or remotely by a human operator. UAVs may operate autonomously (e.g., using artificial intelligence) to make real-time decisions based on, for example, data picked up by sensors in the UAV, environmental conditions, and/or mission objectives. Alternatively, UAVs may be controlled remotely by human operators via radio signals. UAVs may include various types of advanced technology components and control mechanisms to perform specific tasks or missions, control flight dynamics (e.g., stabilization, altitude, speed, control, maneuverability, etc.), power the UAV, enhance safety of the UAV, mitigate risks at the UAV, etc. For example, UAVs may include onboard sensors, Global Positioning System (GPS) navigation systems, and sophisticated algorithms to determine a position, altitude, orientation, speed, etc. of the UAV. UAVs may also include, for example, propulsions systems avionics for propelling the UAV through the air, sensors (e.g., cameras, LiDAR systems, etc.) to perform specific tasks/data detection, and a flight control system (e.g., hardware and software) for controlling the flight dynamics.

In the scenario when the UAVs are controlled by a human operator, the flight control system maintains the UAV flight along a flight path based on, for example, commands from the human operator or pre-programmed flight plan. For example, the flight control system may adjust altitude or orientation based on a command received from the operator, and/or may execute maneuvers or tasks based on commands received from the operator.

The human operator may control the UAV using an aerial vehicle system operating as, for example, a ground control station or a remote controller. The human operator at the aerial vehicle system may be an end user (e.g., owner) of the UAV or a third-party facilitating control of the UAV. The UAV may include different types of input devices, which the operator may use to send commands to the UAV directing a movement, speed, and/or altitude of the UAV and directing the UAV to perform certain tasks/operations. The input devices at the aerial vehicle system may be, for example, gimbals, joysticks, touchscreens, control panels, computer interfaces, etc. The operator may also monitor the UAV status and data transmitted from onboard sensors at the UAV to the aerial vehicle system.

To this end, the UAV may include cellular radio transceivers to enable communication with the aerial vehicle system, which may be necessary for the operator to maintain continuous control and awareness of the UAV. Enabling UAVs to connect to the network via cellular radio links are advantageous in that the UAVs may be connected using a nearly ubiquitous network (unlike the limited ranges associated with the individual drone control links). However, when the UAV flies in an area with a degraded radio connection or no radio connection, the operator may no longer be able to track and control the UAV, which may lead to a host of other technical problems. For example, maintaining awareness and control of the UAV location prevents collisions with other aircraft, obstacles, ground structures, etc. Without the ability to maintain a radio connection with the UAV to continuously monitor the status of the UAV, operators may not be able to manually re-route to prevent collisions, identify issues or malfunctions of the UAV, take potential corrective actions to mitigate risks, etc. Thus, ensuring that the UAV maintains radio connectivity at all times during flight is of primary significance when an operator remotely controls the UAV at the aerial vehicle system, and particularly when the UAV is beyond the line of sight of the operator.

However, remote UAV operators may not consider UAV radio connectivity or radio signal strength when planning a flight path for the UAV. Instead, the operator at the aerial vehicle system defines a pre-programmed flight path for the UAV based on various factors (e.g., airspace regulations, weather, ground risk, terrain, etc.) The UAV may be programmed to follow the pre-programmed flight path, regardless of whether the UAV maintains a radio connection to the network while following the flight path. Therefore, the UAV may simply lose radio connectivity while following the flight path (which may result in some of the aforementioned technical problems), or the UAV may have to manually switch to another carrier operated cell tower if the UAV has a Subscriber Identity Module (SIM) card or profile for the other carrier. In this way, methods of controlling a UAV flight plan without consideration of radio connectivity and radio signal strength may lead to dropped/degraded radio connections between the UAV and the aerial vehicle system, and also result in the inefficient use of network resources.

The present disclosure addresses the foregoing technical problems by providing a technical solution in the technical field of UAV network connectivity by transmitting radio connectivity and radio signal strength data to the aerial vehicle system such that a flight tunnel (e.g., corridor) may be determined for the UAV based on the connectivity and signal strength data. When the UAV routes within the flight tunnel, the UAV maintains an optimal radio connection to the network (e.g., at least one cell site in the network) throughout the duration of the flight. In other words, the embodiments disclosed herein enable the UAV to maintain network radio connectivity during flight by tailoring the flight plan of the UAV based on a signal strength to a cell site in the network. Since the UAV maintains network connectivity during flight, operators may be able to continuously track the location and status of the UAV without disruption, and may be able to ensure full operational control of the UAV during flight. In this way, operators may prevent UAV collisions/equipment failures/operational disruptions, ensure UAVs complete objectives efficiently while optimizing resource allocation, ensure compliance with UAV regulations, enhance security based on unauthorized UAV activity, etc.

The terms "connectivity," "connection," and "signal strength," as used herein, may refer to "cellular radio connectivity," "cellular radio connection," and "cellular radio signal strength." In other words, the networks, connections, and signals referred to herein primarily refer to the cellular radio communication networks, connections, and signals (e.g., not merely radio links).

In an embodiment, the operator may input one or more input parameters for a UAV flight into the aerial vehicle system. For example, the aerial vehicle system may include a user interface and/or input devices by which the operator may manually type or select the input parameters for the UAV. The input parameters may include at least one of a current location of the UAV, a direction, a destination, one or more waypoints, a location range, an altitude, a channel, a time, one or more preferences of the operator, a requested threshold signal strength, etc. The input parameters may also include operations, tasks, and/or missions for the UAV to perform and accomplish during flight. For example, the operations may indicate that the UAV is to record a ground area during flight using a camera and send the recording back to the aerial vehicle system or to another destination. The aerial vehicle system may include an application that may transmit the input parameters to the carrier network system.

The carrier network system may include, for example, a radio access network (RAN) and a core network associated with a particular mobile network operator (MNO) or carrier. The RAN may include one or more cell sites (e.g., base stations, cell tower) and/or other network elements that may be positioned at various geographic locations covered by the MNO. Each cell site may have a cell site coverage area, which may refer to a three-dimensional geographic region in which the cell site provides a reliable signal coverage, extending horizontally across the ground and vertically to various altitudes, ensuring seamless connectivity for mobile devices within that space. The signal strength from a cell site may degrade as the distance from the cell site increases. A specified geographic area may include multiple cell sites each having different coverage areas, some of which may overlap and some of which may not. The coverage areas for the cell sites may be used to define potential flight tunnels for the UAV based on the input parameters, as further described herein.

The carrier network system may include a connectivity application that may identify one or more cell sites for the UAV to connect based on the input parameters. For example, when the input parameters include a current location of the UAV and a destination location, the connectivity application may identify one or more cell sites within a geographic area (e.g., a predefined distance) encompassing both the current location of the UAV and the destination location. When the input parameters include one or more waypoints, the connectivity application may identify one or more cell sites encompassing the one or more waypoints. When the input parameters include a location range, the connectivity application may identify one or more cell sites within the location range.

The connectivity application may obtain, from a data store at the carrier network system, signal range data corresponding to each of the identified cell sites. The signal range data for each of the identified cell sites may indicate a three-dimensional range (e.g., latitude 1-latitude 2 range, longitude 1-longitude 2 range, and altitude 1-altitude 2 range) in which reliable signal coverage is provided by the cell site. For example, the signal range data for a cell site may indicate a latitude range, a longitude range, and an altitude range within which the signal strength of the cell site is greater than or equal to a signal strength threshold.

The connectivity application may obtain the signal range data for the cell sites that have a reliable signal coverage above a threshold based on a known coverage area for a cell site (which may be stored at the core network) and the input parameters. The connectivity application may then transmit the signal range data to the aerial vehicle system. The signal range data may include the three-dimension range information, but may not include any identification or location information of the associated cell sites. In this way, the information provided to the aerial vehicle system retains the privacy of the cell site location information.

The application at the aerial vehicle system may use the received signal range data and the input parameters to determine one or more flight tunnels for the UAV. A flight tunnel may indicate a three-dimensional flight tunnel within which the UAV maintains a signal strength greater than a pre-defined signal strength threshold when the UAV flies within the flight tunnel. In this way, the flight tunnel may be a flight path window or flight corridor through which the UAV may route to reach the destination, the waypoints, or stay within a location range (as specified in the input parameters) while maintaining network connectivity to ensure a reliable and strong network connection during flight. When the application determines more than one flight tunnel for the UAV based on the input parameters, other flight tunnel factors may be considered to select an optimal flight tunnel for the UAV. For example, airspace regulations, ground risk, terrain, weather, and other flight tunnel factors (e.g., obtained from other live data stores) may be evaluated to determine an optimal flight tunnel for the UAV.

The connectivity application may continuously monitor the network connectivity provided by each of the cell sites in the RAN. In some cases, one or more cell sites may experience a fault or complete failure (thereby disconnect every device and UAV connected to the cell site). In other cases, one or more cell sites may experience a degraded connection (e.g., high latency, low bandwidth, low signal strength, etc.). In these cases, the connectivity application may identify changes to the signal range data that was previously sent to the aerial vehicle system for flight tunnel determination. The connectivity application may use one or more re-route rules to determine conditions upon which to transmit updated signal range data to the aerial vehicle system. For example, a re-route rule may indicate that when a signal strength from a cell site is less than a signal strength threshold and when the signal range data for this cell site was initially sent to the aerial vehicle system for flight tunnel determination, the connectivity application may be triggered to transmit updated signal range data to the aerial vehicle system indicating that the signal strength from a cell site has fallen below the signal strength threshold. The connectivity application may then identify a second cell site based on the input parameters that has a signal strength greater than the signal strength threshold and that may replace the prior cell site in the flight tunnel along a path to a destination/through waypoints/within a location range. The connectivity application may transmit second signal range data corresponding to the second cell site to the application at the aerial vehicle system. The application at the aerial vehicle system may then re-route the flight tunnel based on the second signal range data associated with the second cell site.

In an embodiment, the UAV may obtain signal strength data during flight (e.g., testing signal strength at different 3D locations within the flight tunnel). The UAV may transmit the signal strength data and corresponding location data to the connectivity application in the carrier network system. The connectivity application may use the signal strength data and corresponding location data to validate or adjust the signal range data for a respective cell site as needed. For example, when an edge location of the tunnel does not have the expected signal strength (as indicated in the signal strength data and corresponding location data), the connectivity application may adjust the signal range data to remove the edge location from the three-dimensional range indicated in the signal range data.

In an embodiment, UAV data collected/captured at the UAV may be transmitted through the RAN across dedicated UAV network slices when the UAV data is identified as originating from a UAV (as opposed to another type of device). A network slice is a virtualized, isolated portion of a network infrastructure, providing a specific set of resources and services tailored to meet requirements of particular user groups, applications, or services. Each network slice may be associated with a network profile. A network profile indicates the requirements, capabilities, and attributes of each associated network slice (e.g., quality of service, service level agreements, resource allocation, security policies, traffic management, service dependencies, etc.).

In an embodiment, UAVs in general, different types of UAVs, or UAVs performing different operations/missions may be assigned to different network profiles. For example, UAV data including captured camera image data may be associated with a network profile specifying a network attribute requirement for a high-resolution bandwidth, UAV data including cargo delivery data may be associated with a network profile with lower baseline network attribute requirements, etc. The connectivity application may use policies defining network profiles for different UAVs to determine the appropriate network profile (and corresponding network slice) for the UAV data. The connectivity application may instruct a network element (e.g., routers, virtual private network (VPN), virtual network function (VNF)) to route the UAV data along one or more network elements in the network slice identified in the network profile.

In this way, the embodiments disclosed herein serve to ensure that the UAV maintains network connectivity during flight, thereby decreasing the occurrence of UAV network disconnects, collisions, and other associated problems. The embodiments disclosed herein also provide for guaranteed network features for UAV data using dedicated network slices. Therefore, in general, the embodiments disclosed herein also serve to increase system capacity by decreasing dropped connections and utilizing network resources efficiently.

Turning now to FIG. 1, a communication network 100 is described. The communication network 100 includes an unmanned aerial vehicle (UAV) 103, an aerial vehicle system 106, a carrier network system 109, a network data store 112, a data store 117, and a network 121. Network 121 may be one or more private networks, one or more public networks, or a combination thereof, interconnecting the UAV 103, aerial vehicle system 106, carrier network system 109, network data store 112, and data store 117. While FIG. 1 illustrates the aerial vehicle system 106, carrier network system 109, network data store 112, and data store 117 as being separate from the network 121, it should be appreciated that in some embodiments, aerial vehicle system 106, carrier network system 109, network data store 112, and data store 117 may be part of the network 121. While FIG. 1 illustrates the network data store 112 as being separate from the carrier network system 109, it should be appreciated that in some embodiments, the carrier network system 109 may include the network data store 112.

The UAV 103 is an unmanned aircraft controlled either autonomously, by onboard computer systems, or remotely by a human operator. The UAV 103 may be connected to the network 121 using a wired or wireless communication link (e.g., using a local area network or a base station, and communicating to the network 121 via a cellular or WiFi connection). For example, the UAV 103 may communicate with the network 121 according to a 5G, a long term evolution (LTE), a code division multiple access (CDMA), or a global system for mobile communications (GSM) wireless telecommunication protocol.

The UAV 103 (also referred to as a "drone" in some contexts) may include various types of sensors 126 (e.g., camera systems, meters/measurement devices, LiDAR sensors, infrared sensors, GPS sensors, gas/chemical sensors, etc.). The UAV 103 may also include a central processing unit (CPU) 129 and a memory 132, which may store software that controls the hardware components of the UAV 103 to implement a flight control system. The UAV 103 may also include one or more SIMs 135 (in the form of SIM cards or electronic SIM (eSIM) profiles). A SIM card is a small, removable card used in devices (such as the UAV 103 and other mobile devices) to securely store subscriber identity information and authentication users on cellular networks (e.g., the carrier network system 109). An eSIM profile is a digital configuration that replaces the physical SIM card, allowing devices to connect to the cellular networks without requiring a physical SIM card. The eSIM profile also securely stores the subscriber identity information to authenticate users with the cellular networks. The UAV 103 may include one or more SIM cards and/or eSIM profiles, each including the information to authenticate with different cellular networks operated by different MNOs.

The UAV 103 may include a radio transceiver 137, which may be used to transmit and receive cellular radio signals (e.g., through the carrier network system 109 and the network 121), enabling a two-way communication over wireless channels. The UAV 103 may include a flight system 139, which may include the components for enabling the UAV 103 to fly (e.g., one or more electrical/gas motors, propellers, actuators, onboard electric battery, etc.). The UAV 103 may also have some similar limitations. For example, the UAV 103 may include a limited on-board source of energy (e.g., electric battery power or gasoline). In some cases, the limited energy store of the UAV 103 may be a factor in determining a flight path for a UAV 103.

The UAV 103 may also include a UAV application 120 stored at the memory 132 and executable by the CPU 129. The UAV application 120 may communicate with the aerial vehicle system 106 and perform flight routing and various operations/tasks based on commands received from the aerial vehicle system 106. The UAV 103 may include a data store 123 (e.g., stored in the memory 132) that stores UAV data 138. UAV data 138 may include all of the data collected by the UAV 103 during flight. For example, UAV data 138 may include various different types of data collected by the different sensors 126 (e.g., camera recordings), status/location data of the UAV 103 during flight, signal strength determined at different locations during flight, status of operations/tasks performed by the UAV 103 during flight, etc. The UAV application 120 may collect the UAV data 138, store the UAV data 138 in the data store 123, and transmit the UAV data 138 to a destination (e.g., aerial vehicle system 106 or other destination) in a secure manner.

The aerial vehicle system 106 may be a computer system, server software/hardware, or a collection of processors, memories, and/or networking resources used to control the UAV 103. The aerial vehicle system 106 may be connected to the network 121 using a wired or wireless communication link (e.g., using a local area network or a base station, and communicating to the network 121 via a cellular or WiFi connection). For example, the aerial vehicle system 106 may communicate with the network 121 according to a 5G, a LTE, a CDMA, or a GSM wireless telecommunication protocol.

The aerial vehicle system 106 may include an application 140 stored in a memory of the aerial vehicle system 106 and executable by a processor of the aerial vehicle system 106 to perform various steps and tasks as further described herein. The aerial vehicle system 106 may also include one or more input devices 141 (e.g., gimbals, joysticks, touchscreens, control panels, computer interfaces, etc.). Operators at the aerial vehicle system 106 may use the input devices 141 to instruct the UAV 103 to fly according to the determined flight tunnels and perform operations.

The aerial vehicle system 106 may also include a data store 143, stored at the memory of the aerial vehicle system 106. The data store 143 may store the data generated by the aerial vehicle system 106 and received from the UAV 103, the carrier network system 109, and/or the data stores 112/117. As shown in FIG. 1, the data store 143 may store the input parameters 146, which may be input into the aerial vehicle system 106 by the operator using the input devices 141. The input parameters 146 may define the requested parameters for the flight path of the UAV 103, which is being remotely controlled and monitored by the aerial vehicle system 106. For example, the input parameters 146 may include a requested destination 142, one or more waypoints 145, a location range 148 (e.g., bounded box/cube), an altitude 151, a channel 154 (e.g., frequency band), a time 157, and/or a signal strength 159 (e.g., to use as the signal strength threshold 179). The input parameters 146 may include other parameters not specifically shown in FIG. 1, such as, for example, a direction, a flight maneuver, an incline/decline angle, operations, tasks, and/or missions for the UAV 103 to perform during flight and/or at the time of takeoff/landing.

The data store 143 may also store signal range data 150, flight tunnel data 152, rules 155, and the UAV data 138. The signal range data 150 may be received from the carrier network system 109 and may include data indicative of the geographic areas in which the UAV 103 may receive reliable and secure signal coverage from one or more cell sites in the carrier network system 109. The flight tunnel data 152 may include data describing the flight tunnels determined by the application 140 based on the received signal range data 150 for the UAV 103 using the input parameters 146. Rules 155 may include one or more conditions applicable to the signal range data 150 (and other flight tunnel factors 194) that may be used to determine flight tunnels for the UAV 103 based on the input parameters 146 or select a flight tunnel from multiple flight tunnels. The UAV data 138 may be received from the UAV 103 before, during, and/or after flight.

The carrier network system 109 may be a telecommunications access network owned and operated by a MNO or carrier. The carrier network system 109 may include a radio access network (RAN) 163 and a core network. The RAN 163 may facilitate wireless communication and may include various network elements, such as, for example, cell sites and base stations. Each cell site may have a cell site coverage area, which may refer to a three-dimensional geographic region in which the cell site provides a reliable signal coverage, extending horizontally across the ground and vertically to various altitudes, ensuring seamless and secure network connectivity for mobile devices (including UAVs 103) within that space. The signal strength from a cell site may degrade as the distance from the cell site increases. A specified geographic area may include multiple cell sites each having different coverage areas, some of which may overlap and some of which may not. The RAN 163 may allow authorized devices (e.g., UAVs 103 with authorized SIMs 135) to connect to the services offered by the carrier network system 109, providing flexibility and coverage in various locations covered by the cell sites. The core network may handle the processing, routing, and management of the communications through the RAN 163.

The carrier network system 109 may also include a connectivity application 160 (e.g., as a new core network component or a function of an existing core network component). The connectivity application 160 may include instructions stored on a memory of the carrier network system 109 and executable by a processor of the carrier network system 109 to perform various operations as further disclosed herein. The carrier network system 109 may include a data store 166 in a memory of the carrier network system 109. The data store 166 may store mappings between a cell site identifier 170 identifying a cell site, signal range data 150 of the cell site, and feedback data 173 received from the UAVs 103 related to the cell site. The cell site identifier 170 may be a value identifying the cell site in the RAN 163. The signal range data 150 may indicate a 3D geographical area, with a range of latitudinal, longitudinal, and altitude values encompassing a respective cell site, within which signal strength may be optimal (e.g., above a signal strength threshold 179).

The feedback data 173 may be data regarding the detected signal strength at different locations in the 3D geographic area received from the UAV 103 in the UAV data 138. For example, the feedback data 173 may be collected from the UAV data 138, which may indicate an actual signal strength at various geographic locations (e.g., within the coverage area of a cell site). The feedback data 173 may be used to adjust the signal range data 150, such that the adjusted signal range data 150 may be used to find new flight paths (e.g., within the flight tunnels described herein) for different UAVs. The data store 166 may store the cell site identifier 170 with corresponding signal range data 150 and feedback data 173 mappings for respective cell sites in the RAN 163.

The data store 166 may also store the signal strength threshold 179, which may be a default preset threshold indicating a minimum signal strength needed for reliable coverage from the cell site. The signal strength threshold 179 may also be a requested signal strength 159 as indicated in the input parameters 146 (e.g., when the UAV demands a higher signal strength 159 for security purposes). The data store 166 may also store re-route rules 182, which may include one or more rules or conditions for re-defining the geographical area indicated in the signal range data 150 of the cell site (e.g., when the signal strength at a location is greater than or equal to the signal strength threshold 179, then include the location in the signal range data 150 for the cell site).

The network data store 112 may be a memory, which may be distributed, stored locally at the aerial vehicle system 106, stored remotely at a separate server or data center, or stored in any other manner. The network data store 112 may store data regarding network profiles 185 that may be assigned for data traffic related to UAVs 103 (e.g., data traffic received from UAVs 103, data traffic received from different types of UAVs 103, UAVs 103 assigned to perform certain types of tasks/operations, certain types of UAV data 138, etc.). The network profiles 185 may each include an identification (network slice identifier 191) of an associated network slice and the tailored resources/services provided by the associated network slice for the transmission of the data traffic. The network data store 112 may also include policies 188, which may indicate the associations between the UAVs 103/data traffic and the associated network profile 185.

The data store 117 may be a memory, which may be distributed, stored locally at the aerial vehicle system 106, stored remotely at a separate server or data center, or stored in any other manner. The data store 117 may store flight tunnel factors 194, which may refer to additional factors that may be evaluated by the application 140 when determining or selecting a flight tunnel for the UAV 103. The flight tunnel factors 194 may include weather data, airspace regulation data, terrain data, ground risk data, and/or other types of data that may be relevant to the flight planning of the UAV 103 (but not necessarily related to the connectivity of the UAV 103). The different types of flight tunnel factors 194 may be stored across different, separate data stores, but is shown in FIG. 1 to be stored in a single data store 117 for illustrative purposes only.

Figure 2A:
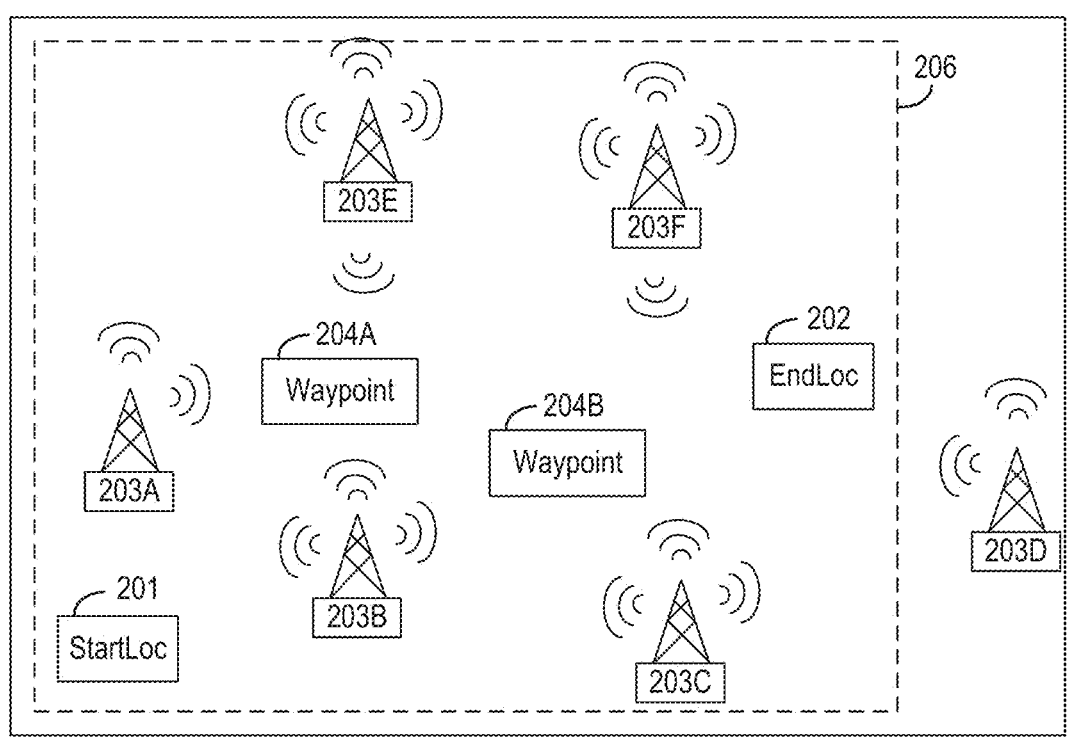
FIGS. 2A, 2B, and 2C are diagrams illustrating aerial vehicle routing based on optimal network connections in the communication network of FIG. 1 according to various embodiments of the disclosure.
Figure 2B:
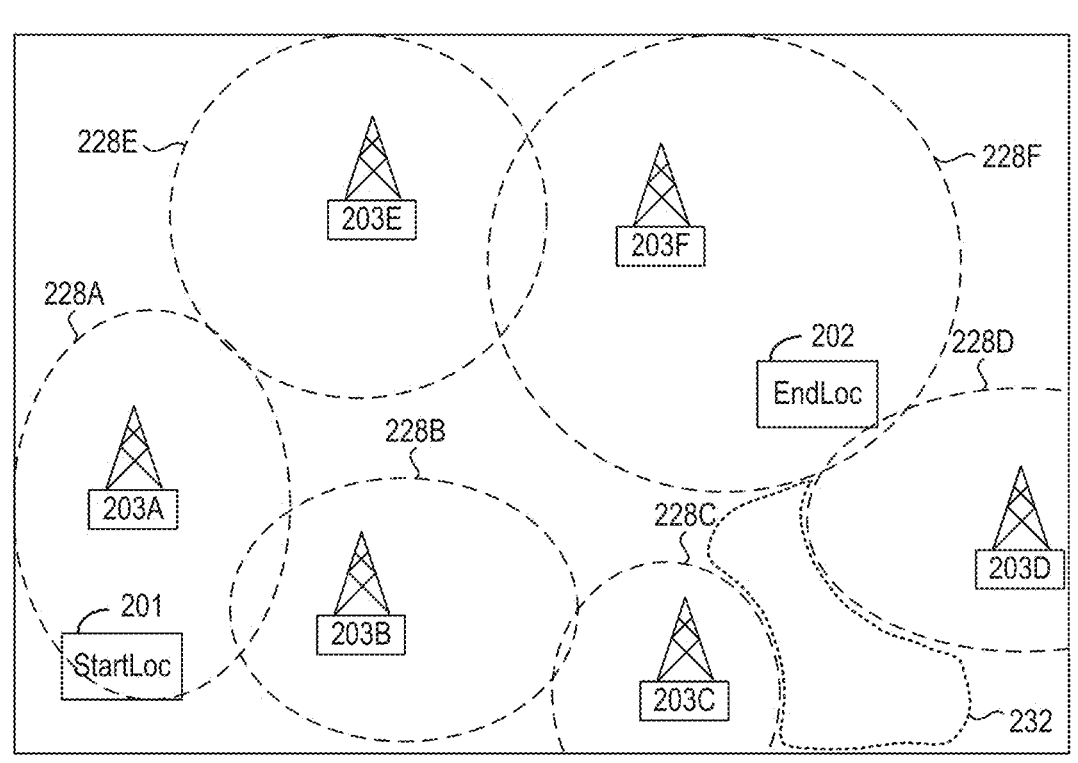
Figure 2C:
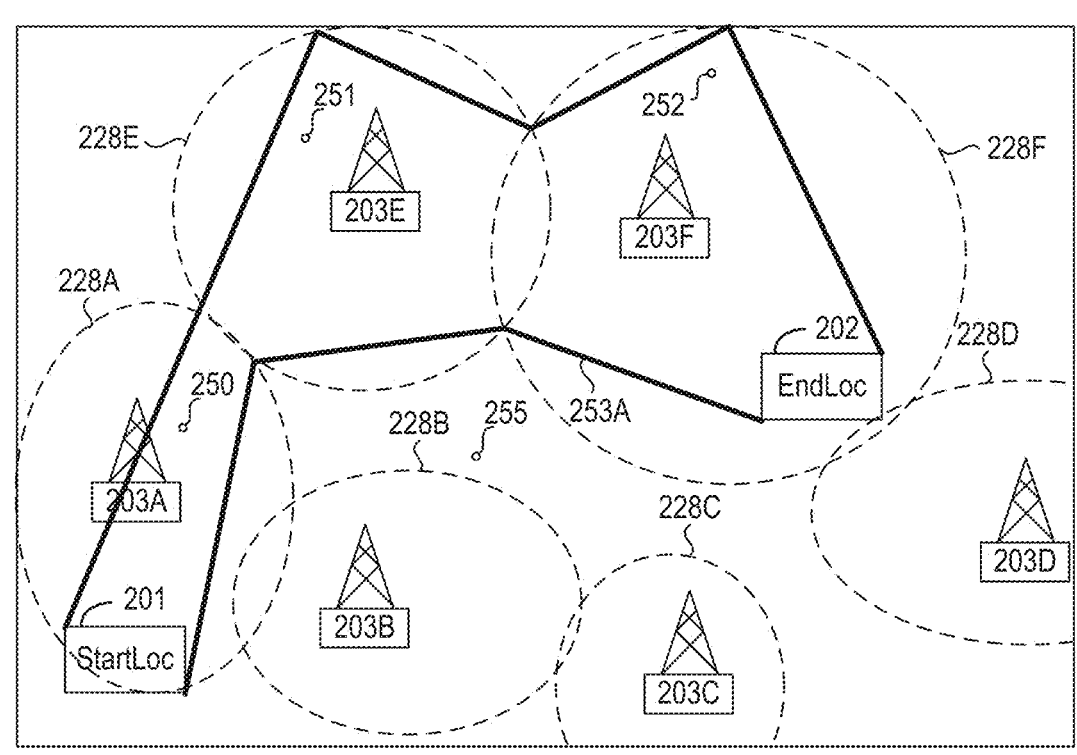

Referring now to FIGS. 2A, 2B, and 2C, shown are diagrams illustrating the determination of the flight tunnels based on the input parameters 146 received at the aerial vehicle system 106 according to various embodiments of the disclosure. In particular, FIG. 2A illustrates cell sites within a predefined distance from a current location of the UAV 103, FIG. 2B illustrates the coverage area of each of the cell sites, and FIG. 2C shows a flight tunnel determined for the UAV 103 from the current location to an end location.

Turning now specifically to FIG. 2A, shown is a geographic area 200 encompassing a current location 201 of a UAV 103 (shown in FIG. 2A as the "StartLoc") and multiple cell cites 203A-F within a predefined distance of the current location 201. Each of the cell sites 203A-F may be indicated in a respective location in the geographic area 200 based on actual coordinates (latitude and longitude) of the respective cell sites 203A-F in the field. A height of each of the cell sites 203A-F in the geographic area 200 may also be representative of a height of the respective cell sites 203A-F in the field.

The geographic area 200 also indicates an end location 202 of the UAV 103 (shown in FIG. 2A as the "EndLoc"), which may be an input parameter 146 received from the operator at the aerial vehicle system 106 (e.g., as the destination 142). In an embodiment, the cell sites 203A-F identified for the UAV 103 may be a predefined distance from both the current location 201 and the end location 202 of the UAV 103. In an embodiment, the connectivity application 160 may identify the cell sites 203A-F for the UAV 103 based on at least one of the current location 201 and the requested end location 202 of the UAV 103.

The geographic area 200 also includes two waypoints 204A-B, indicating specific geographic locations defined by coordinates or landmarks that the UAV 103 is to navigate to and through during completion of an operation or task (the UAV 103 may or may not land at the waypoints 204A-B). The coordinates of the two waypoints 204A-B may be received as input parameters 146 at the aerial vehicle system 106 (e.g., as the waypoints 145).

The geographic area 200 also includes a bounded box 206, indicating a location range or box within which the UAV 103 is to navigate through (e.g., for monitoring or surveillance purposes). For example, the UAV 103 may operate in an automation mode (e.g., using artificial intelligence without necessarily being actively controlled remotely by an operator) to continue flying through the area represented by the bounded box 206 (as opposed to directing the UAV from the current location 201 to the end location 202, through zero or more waypoints 204A-B). The bounded box 206 may be represented by coordinates defining the latitudinal and longitudinal boundaries of the area included in the bounded box 206 (e.g., first latitude boundary, second latitude boundary, first longitude boundary, second longitude boundary, etc.). The coordinates of the boundaries of the bounded box 206 may be received as input parameters 146 at the aerial vehicle system 106 (e.g., location range 148). While the bounded box 206 shown in FIG. 2A is shaped as a box, it should be appreciated that any geometric bounded region (e.g., more complex asymmetrical geometric bounded regions, aside from a box) may also be used as a bounded area, similar to the bounded box 206. For example, the bounded area may be a bounded trapezoid, a bounded pentagon, a bounded hexagon, a bounded polygon, etc.

While only six cell sites 203A-F are shown in FIG. 2A, it should be appreciated that the geographic area identified for a given UAV 103 may include any number of cell sites 203A-F. While only two waypoints 204A-B are shown in FIG. 2A, it should be appreciated that any number of waypoints 204A-B may be specified for a UAV 103. Moreover, while FIG. 2A shows the current location 201, end location 202, waypoints 204A-B, and bounded box 206, it should be appreciated that the cell sites 203A-F may be identified for the UAV 103 based on any one or more of the current location 201, end location 202, waypoints 204A-B, and bounded box 206.

Turning now to FIG. 2B, shown are the coverage areas 228A-F for each of the cell sites 203A-F identified in FIG. 2A, respectively. A coverage area 228A-F may refer to a 3D geographic region in which the cell sites 228A-F provide a reliable signal coverage, extending horizontally across the ground (X-axis) and vertically to various altitudes (Y-axis), and covering a space between (Z-axis). In some cases, the cell site 203A-F may be positioned at the center of the coverage area 228A-F when the coverage area 228A-F is spread equally across all directions from the cell site 203A-F. In other cases, the coverage area 228A-F of the cell sites 203A-F varies depending on factors such as the antenna configuration at the cell site 203A-F, transmission power, beamforming, antenna height, terrain, obstacles, and environmental conditions. The coverage areas 228A-F shown in FIG. 2B are circular and elliptical in shape by way of example only, and the coverage areas 228A-F should not be construed to be limited to the circular and elliptical shapes shown in FIG. 2B. Rather, it should be appreciated that the coverage areas 228A-F from the cell sites 203A-F may be shaped irregularly or in an elliptical pattern, with the strongest signal intensity concentrated in the direction where the antenna is pointed, and gradually weakening as the UAV 103 moves further from the antenna at the cell site 203A-F.

As shown in FIG. 2B, some of the coverage areas 228A-F may overlap in coverage (e.g., coverage area 228A and coverage area 228B may have a small overlapping region). The geographic area 200 may also include regions 232 in which adequate coverage is not provided by any of the cell sites 203A-C (e.g., the signal strength in the region 232 is below the signal strength threshold 179). A region 232 may not have adequate coverage when the signal strength received from any neighboring cell site 203C, 203F, and 203D is not at least a signal strength threshold 179.

The coverage area 228A-F of a cell site 203A-F may be adjusted manually by a network operator to ensure efficient use of resources, minimize interference, and provide adequate coverage to areas with high user demand (e.g., by adjusting antenna tilt, orientation, power levels, and other parameters to achieve a desired coverage pattern). The coverage area 228A-F of a cell site 203A-F may also change over time without network operator influence, based on various network factors (e.g., high load, network congestion, outages, failures, etc.).

The application 140 may use the coverage areas 228A-F of the identified cell sites 203A-F to determine the signal range data 150, which may indicate a 3D geographic range in which the reliable signal coverage is provided by the cell site 203A-F. In an embodiment, the signal range data 150 for a cell site 203A-F may include coordinates indicating boundaries of the 3D range of the respective coverage area 228A-F. However, in some cases, the signal range data 150 may be specifically based on other input parameters 146 (e.g., the destination 142 and/or the waypoints 145), such that the 3D geographic range indicated in the signal range data 150 does not include the entire coverage area 228A-F, but only a relevant portion of the coverage area 228A-F. For example, the signal range data 150 may include only the 3D geographic range of the coverage area 228A-F that is en-route to the end location 202 or that includes the waypoints 204A-B (e.g., excluding areas in the coverage areas 228A-F that are not en-route to the end location 202). In this way, the signal range data 150 for a cell site 203A-F may include the entire respective coverage area 228A-F of the cell site 203A-F, or a portion of the respective coverage area 228A-F based on the input parameters 146.

Turning now to FIG. 2C, shown is the flight tunnel 253A determined for the UAV 103 according to various embodiments of the disclosure. In an embodiment, the application 140 may determine the flight tunnel 253A based on the input parameters 146 (e.g., the current location 201 of the UAV 103 and the requested end location 202 of the UAV 103) and the signal range data 150 of the cell sites 203A-F. For example, the application 140 may determine the flight tunnel 253A as an area/corridor beginning at the current location 201, through only areas within the coverage areas 228A, 228E, and 228F of the cell sites 203A, 203E, and 203F (as determined based on the respective signal range data 150 for the cell sites 203A, 203E, and 203F), to the end location 202. As described above with reference to FIG. 2B, the signal range data 150 may be based on the coverage areas 228A-F of each of the cell sites 203A-F, and the application 140 may use the signal range data 150 to determine the areas within the coverage areas 228A-F that may be used for flight tunnels 253A.

The flight tunnel 253A may be 3D flight path range (e.g., or corridor) within which the UAV 103 maintains a signal strength greater than the signal strength threshold 179 when the UAV 103 flies within the flight tunnel 253A. For example, the flight tunnel 253A may be defined by the flight tunnel data 252, which may indicate latitudinal, longitudinal, and altitude coordinate ranges across a path or region covered by one or more cell sites 203A-F. When the UAV 103 flies within the coordinate ranges of the flight tunnel 253A (either to the end location 202, through waypoints 204A-B, or within the bounded box 206), the UAV 103 may maintain a reliable connection to the network via one or more of the cell sites 203A-F. For example, the operator or the application 140 at the aerial vehicle system 106 may program the UAV 103 to fly from location 250 (having a latitude, longitude, and altitude set of coordinates), to location 251 (having a latitude, longitude, and altitude set of coordinates), to location 252 (having a latitude, longitude, and altitude set of coordinates), to the end location 202, even though this path may not be the shortest distance path from the current location 201 to the end location 202. However, this path will ensure that the UAV 103 maintains a reliable network connection during the entire duration of the flight from the current location 201 to the end location 202 since this path is entirely within the flight tunnel 253A.

Meanwhile, if the UAV 103 is programmed to fly from the current location 201, to location 255 (having a latitude, longitude, and altitude set of coordinates and not being within the flight tunnel 253A), to the end location 202, this path may be significantly shorter than the path within the flight tunnel 253A. However, the UAV 103 will lose connection for a significant duration of the flight since location 255 is within a region without adequate network coverage. Therefore, in this situation, the shortest path may not maintain network coverage during the entire duration of the flight, and thus, it may be beneficial to fly along a path within the flight tunnel 253A instead to ensure the UAV 103 maintains a stable and reliable network connection during the entire duration of the flight.

Figure 3A:
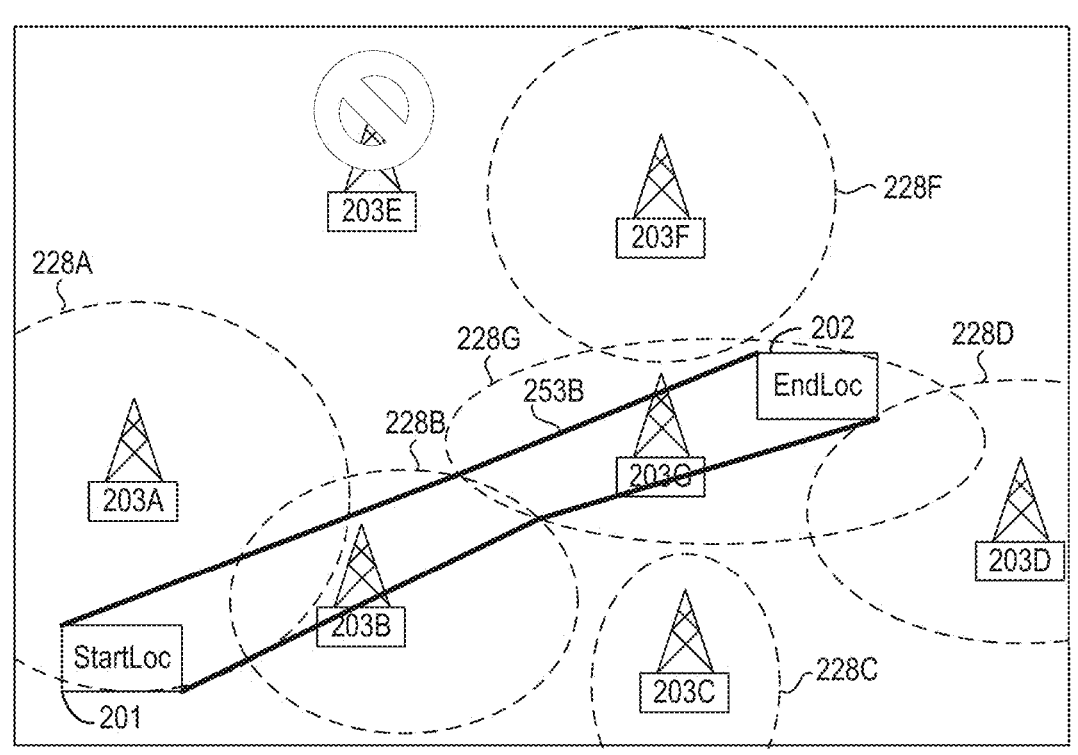
FIGS. 3A and 3B are diagrams illustrating aerial vehicle re-routing in response to network connection changes in the communication network of FIG. 1 according to various embodiments of the disclosure.
Figure 3B:
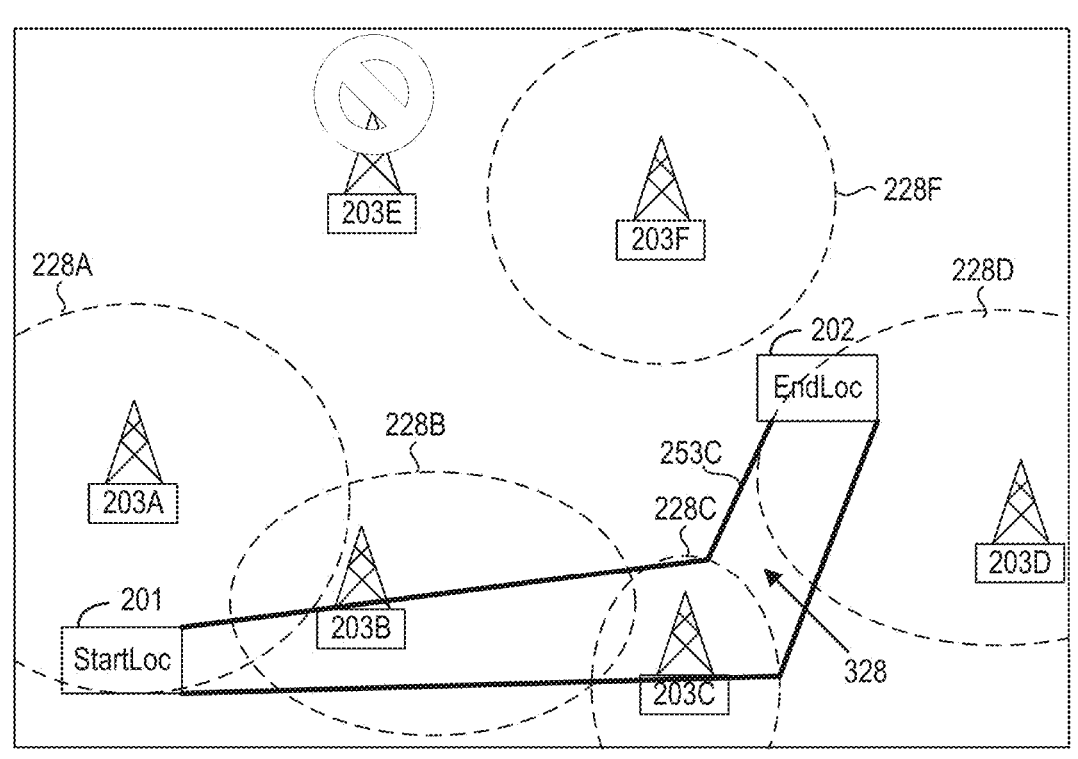

Referring now to FIGS. 3A and 3B, shown are diagrams illustrating the re-routing of UAVs 103 through different flight tunnels 253A when network conditions change that affect the previously identified flight tunnel 253A for a UAV 103. In particular, FIG. 3A illustrates a scenario in which a new flight tunnel is identified for a UAV 103 in response to an outage or degraded condition occurring at a cell site 203A-F, and FIG. 3B illustrates a scenario in which the new flight tunnel includes an area without coverage from a cell site 203A-F associated with an MNO.

Turning now specifically to FIG. 3A, shown is a geographic area 300 encompassing a current location 201 of a UAV 103, and end location 202 of the UAV 103, multiple cell sites 203A-G, and the respective coverage areas 228A-D and F-G for each of the cell sites 203A-G. As shown in FIG. 3A, the cell site 203E may have experienced an outage (e.g., a failure has occurred at the cell site 203E such that all connections to the cell site 203E is dropped). Alternatively, the cell site 203E may be experiencing degraded network conditions (e.g., low bandwidth, high congestion, or other poor network operating conditions), rendering the signal strength from the cell site 203E too low to connect to UAVs 103. For example, a football game may be occurring at a region served by the cell site 203E, and there may be little to no signal available from the cell site 203E due to the number of users at the game (e.g., high congestion). When the outage or poor network operating conditions occur at the cell site 203E, the cell site 203E may no longer have the coverage area 228E with reliable signal strength, leaving an opening in the geographic area 300 in which there is no longer adequate cellular coverage in the prior coverage area 228E.

The application 140 may receive a notification of the outage/failure at the cell site 203E, and update the signal range data 150 of the cell site 203E to indicate the lack of coverage (e.g., remove/edit the coordinates of the signal range data 150 previously indicated for the cell site 203E). The application 140 may identify other cell sites 203B and 203G with coverage areas 228B and 228G, respectively, that may provide the UAV 103 with a network connection (above a signal strength threshold 179) along an aerial path from the current location 201 to the end location 202. The application 140 may then determine an updated flight tunnel 253B based on the newly identified coverage areas 228B and 228G.

Referring now to FIG. 3B, shown is a geographic area 325, which is similar to geographic area 300, except that the geographic area 325 does not include the cell site 203G and the corresponding coverage area 228G. Otherwise, the outage/failure similarly occurs at the cell site 203E, and the other cell sites 203A-D and F and corresponding coverage areas 228A-D and F remain the same as the coverage area 300 in FIG. 3A.

The application 140 may similarly receive a notification of the outage/failure at the cell site 203E, and update the signal range data 150 of the cell site 203E to indicate the lack of coverage. The application 140 may identify other cell sites 203B and 203C with coverage areas 228B and 228C, respectively, that may provide the UAV 103 with a network connection (above a signal strength threshold 179) along an aerial path from the current location 201 to the end location 202. The application 140 may then determine an updated flight tunnel 253C based on the newly identified coverage areas 228B and 228C.

However, the updated flight tunnel 253C includes a region 328 with no coverage (e.g., a gap between the coverage areas 228C and 228D, in which the signal strength in the region 328 is not sufficient to provide a reliable and secure network connection to any devices in the region 328 using the cell sites 203A-F (particularly, cell sites 203C-D)).

The cell sites 203A-F shown in FIG. 3B may all be owned and operated by a single MNO, and be part of the RAN 163 associated with a single carrier network system 109, which is again owned and operated by the MNO. The UAV 103 may access the cell sites 203A-F after authenticating with the core network in the carrier network system using credentials stored at the SIM(s) 135.

The UAV 103 may include multiple SIMs 135, each associated with a different MNO and thus a different carrier network system (e.g., each including security credentials to authenticate with the core network of different carrier network systems). In this way, each SIM 135 in a UAV 103 may be associated with a different set of cell sites (from a different carrier network system), some of which may have coverage areas within the region 328 not covered by the cell sites 203A-F of the carrier network system 109. For example, a UAV 103 may include a first SIM card for the carrier network system 109 (including cell sites 203A-F), and a second SIM card for another carrier network system (including other cell sites, one of which may have coverage in region 328).

In this case, the aerial vehicle system 106, when planning the flight path within the flight tunnel 235C, may instruct the UAV 103 to connect to the other carrier network system using the second SIM card when entering the region 328, such that the UAV 103 maintains a connection to a carrier network system (and thus to the aerial vehicle system 106) even in the region 328. The aerial vehicle system 106 may also instruct the UAV to connect back to the carrier network system 109 using the first SIM card when entering the coverage area 228D.

In this way, the aerial vehicle system 106 (e.g., an operator of the aerial vehicle system 106 and/or the application 140) may plan a route within the flight tunnel 253C to ensure that the UAV 103 maintains a connection to at least one authorized carrier network system (authorized by a SIM 135 at the UAV 103) during the entire route within the flight tunnel 253C.

Figure 4A:
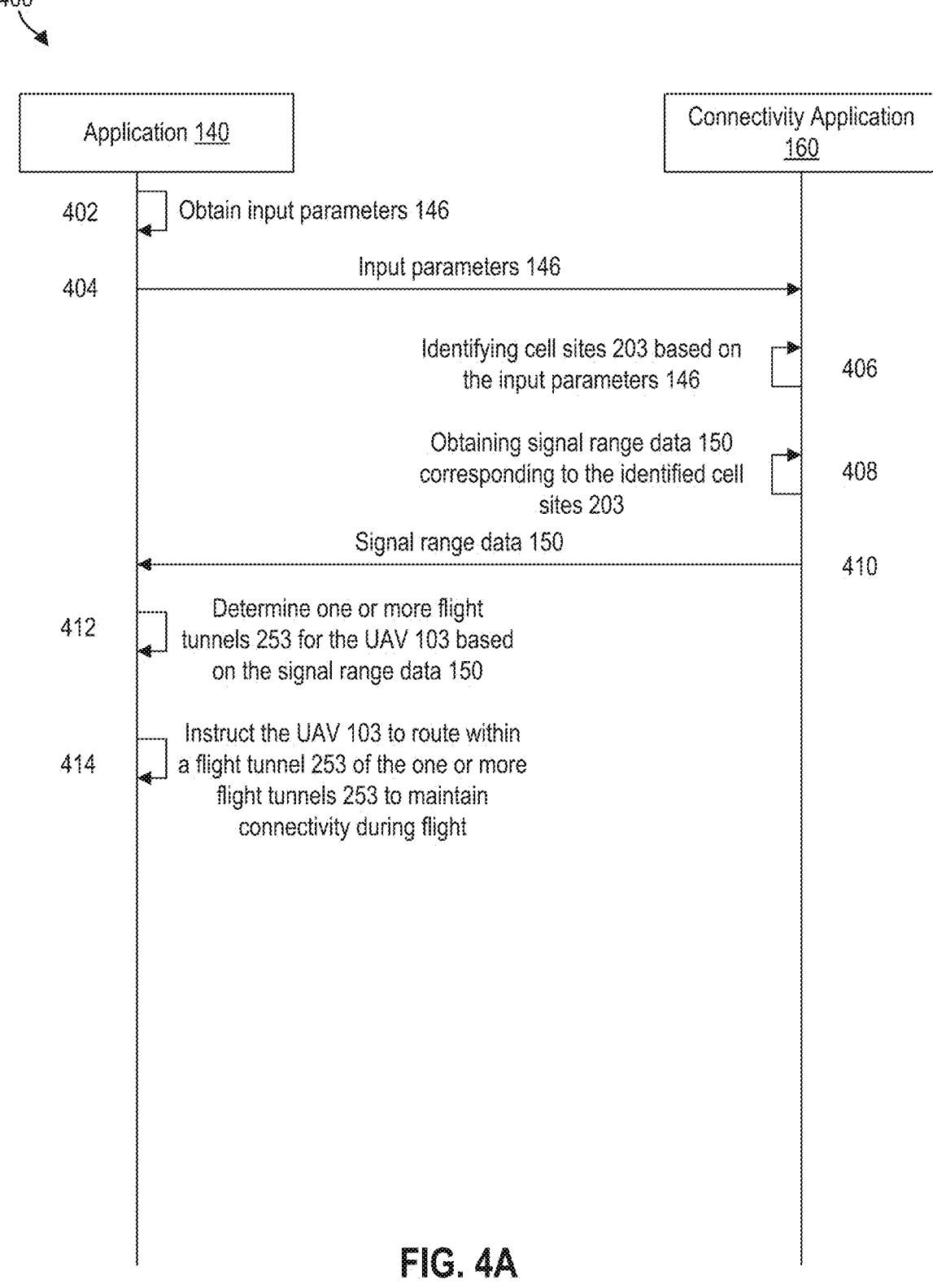
FIGS. 4A, 4B, and 4C is a message sequence diagram illustrating a method for aerial vehicle routing and re-routing based on optimal network connections in the communication network of FIG. 1 according to various embodiments of the disclosure.
Figure 4B:
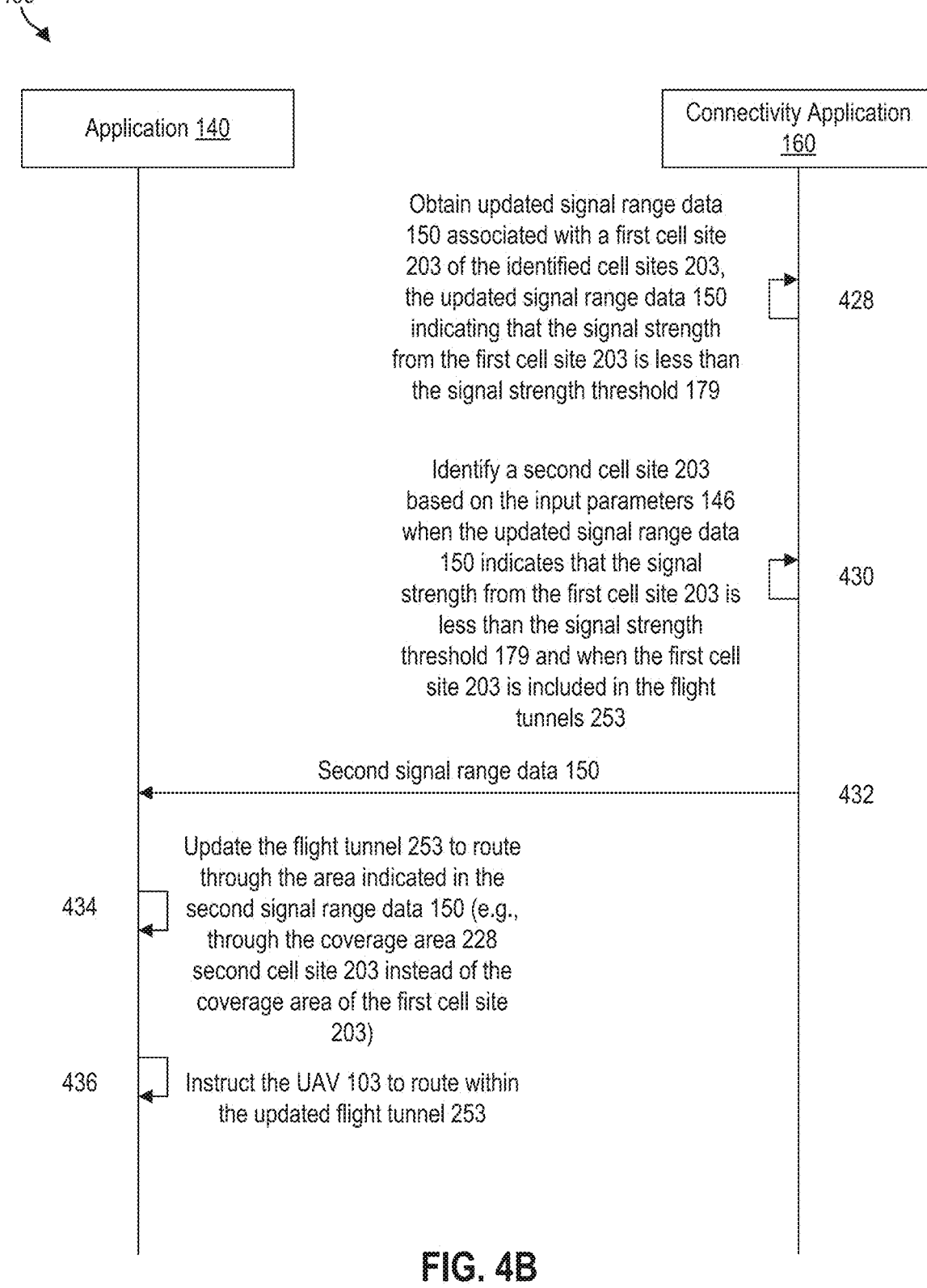
Figure 4C:
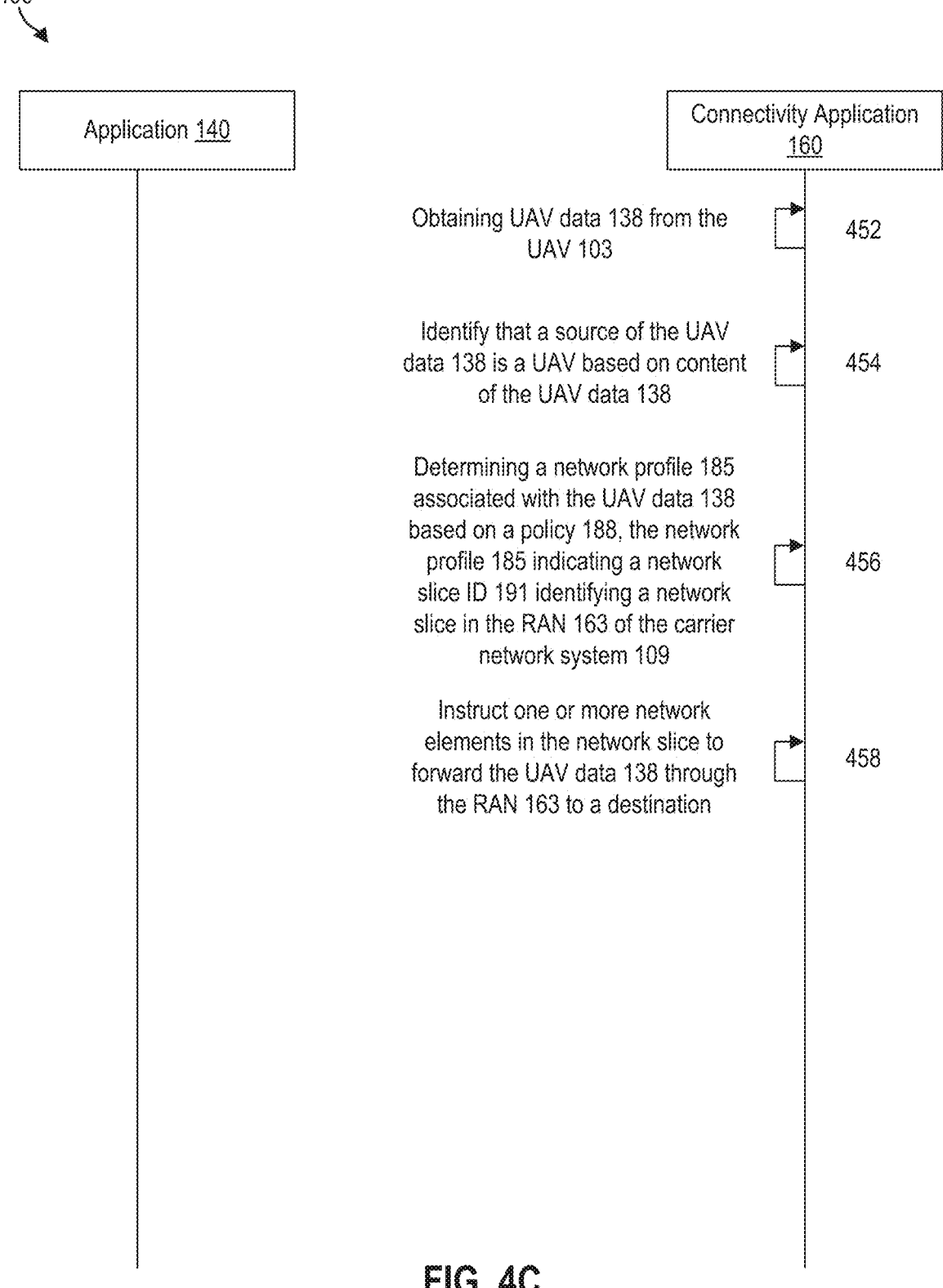

Referring now to FIGS. 4A, 4B, and 4C, shown are message sequence diagrams illustrating a method 400 performed by the application 140 at the aerial vehicle system 106 and the connectivity application 160 at the carrier network system 109 to perform UAV routing based on optimal network connections. Turning now specifically to FIG. 4A, method 400 may begin with operation 402, in which the application 140 obtains the input parameters 146 from an operator remotely controlling the UAV 103. The input parameters 146 may be obtained directly from the operator at the aerial vehicle system 106 via a user interface or the input devices 141, or the input parameters 146 may be received by another device (e.g., a separate device that the operator used to enter the input parameters 146 of the UAV 103, which is then sent to the aerial vehicle system 106). At operation 404, the application 104 may transmit the input parameters 146 to the connectivity application 160.

At operation 406, the connectivity application 160 may identify the cell sites 203A-F (hereinafter referred to as "cell sites 203") for the UAV 103 based on the input parameters 146, as described above with reference to FIG. 2A. For example, the cell sites 203A-F may be identified based on a predefined distance from a current location of the UAV 103, the destination 142 (e.g., end location 202), the waypoints 145 (e.g., waypoints 204A-B), the location range 148 (e.g., bounded box 206), etc.

At operation 408, the connectivity application 160 may obtain signal range data 150 corresponding to each of the identified cell sites 203. The signal range data 150 may be based on the coverage areas 228A-F (hereinafter referred to as "coverage areas 228"), as described above with reference to FIG. 2B. The coordinates of the coverage areas 228 for each cell site 203 may be stored at the core network in the carrier network system 109, and the connectivity application 160 may obtain the coordinates of the coverage areas 228 from the core network. The connectivity application 160 may use the coordinates of the coverage areas 228 and the input parameters 146 to determine the signal range data 150, store the signal range data 150 in the data store 166, and then transmit the signal range data 150 back to the application 140 at operation 410. The signal range data 150 may not include the coordinates or location of the associated cell site 203, to ensure that the location of the cell site 203 is secure and private.

At operation 412, the application 140 may determine one or more flight tunnels 253A-C (hereinafter referred to as "flight tunnels 253") for the UAV 103 based on the signal range data 150 and in some cases, the input parameters 146, as described above with reference to FIG. 2C. For example, the application 140 may stitch together portions of the areas indicated in the signal range data 150 to create a flight tunnel 253 between a current location 201 and an end location 202 of the UAV 103, along one or more waypoints 204A-B, and/or within a bounding box 206. At operation 414, the application 140 may instruct the UAV 103 to route within a flight tunnel 253 of the one or more flight tunnels 253 to maintain network connectivity during flight.

Referring now to FIG. 4B, method 400 continues with operation 428 when, for example, a network outage/failure occurs at one of the identified cell sites 203 of operation 406. At operation 428, the connectivity application 160 may obtain updated signal range data 150 associated with a first cell site 203 of the identified cell sites 203. The updated signal range data 150 may indicate that the signal strength from the first cell site 203 is less than the signal strength threshold 179.

One or more re-route rules 182 may indicate that when the updated signal range data 150 indicates that the signal strength from the first cell site 203 is less than the signal strength threshold 179 and when the first cell site 203 is included in the flight tunnels 253 determined at operation 412, the connectivity application 160 may be triggered to identify one or more other cell sites 203 that may either cover the area along the flight tunnel 253 or provide coverage along another flight tunnel 253. In this case, at operation 430, the connectivity application 160 may identify a second cell site 203 based on the input parameters 146 when one or more re-route rules 182 applies to the condition of the first cell site 203. In other words, the connectivity application 160 may identify the second cell site 203 based on the input parameters 146 when the updated signal range data 150 indicates that the signal strength from the first cell site 203 is less than the signal strength threshold 179 and when the first cell site 203 is included in the flight tunnels 253 determined at operation 412.

At operation 432, the connectivity application 160 may obtain second signal range data 150 associated with the second cell site 203 (e.g., from the data store 166), and transmit the second signal range data 150 to the application 140. The second signal range data 150 may be a 3D geographic range in which reliable signal coverage (greater than or equal to the signal strength threshold 179) is provided by the second cell site 203. At operation 434, the application 140 may update one or more of the flight tunnels 253 to route through the area indicated in the second signal range data 150 (e.g., through the coverage area 228 of the second cell site 203 instead of the coverage area 228 of the first cell site 203). At operation 436, the application 140 may instruct the UAV 103 to route within the updated flight tunnel 253 (that includes area indicated in the second signal range data 150).

Referring now to FIG. 4C, method 400 continues with operation 452 when, for example, the UAV 103 begins collecting UAV data 138 and transmitting the UAV data 138 to a destination (which may be the aerial vehicle system 106 or another device/system external to the aerial vehicle system 106) through the RAN 163. As mentioned above, the UAV 103 may be connected to the RAN 163 of the carrier network system 109 via one or more cell sites 203 during the course of the flight if the UAV 103 stays within the identified flight tunnel 253. The UAV data 138 collected during flight may be transmitted to the destination in real-time during the course of the flight as well as using the resources in the RAN 163.

At operation 452, the connectivity application 160 (which again may be a component in the core network of the carrier network system 109) may receive the UAV data 138 from the UAV 103 in near-real time. At operation 454, the connectivity application 160 may identify a source of the UAV data 138 based on the content of the UAV data 138. For example, the connectivity application 160 may inspect the contents of the UAV data 138 to identify a source of the UAV data 138 (e.g., whether the UAV data 138 truly originates from a UAV (any type of UAV) or another type of device). For example, the content of the UAV data 138 may be aerial camera recordings, and the connectivity application 160 may determine that the source of the UAV data 138 is a UAV based on a policy 188 indicating that aerial camera recordings are received from UAVs.

After verifying that the source of the UAV data 138 is indeed a UAV, at operation 456, the connectivity application 160 may determine a network profile 185 for the UAV data 138 based on a policy 188. The network profile 185 may indicate a network slice identifier 191 identifying a network slice in the RAN 163 of the carrier network system 109, such that the resources in the network slice may be used to transport the UAV data 138 in a manner that meets the UAV data traffic transmission network requirements.

In an embodiment, UAVs in general, different types of UAVs, or UAVs performing different operations/missions may be assigned to different network profiles 185. For example, a policy 188 may indicate that UAV data 138 including camera recordings may be associated with a network profile 185 specifying a network attribute requirement for a high-resolution bandwidth, another policy 188 may indicate that UAV data 138 including cargo delivery data may be associated with a network profile 185 with lower baseline network attribute requirements, etc. The connectivity application 160 may use policies 188 to determine the appropriate network profile 185 (and corresponding network slice based on the network slice identifier 191) for the UAV data 138. At operation 458, the connectivity application 160 may instruct one or more network elements in the network slice to forward the UAV data 138 through the network slice in the RAN 163 to the specified destination of the UAV data 138.

Figure 8:
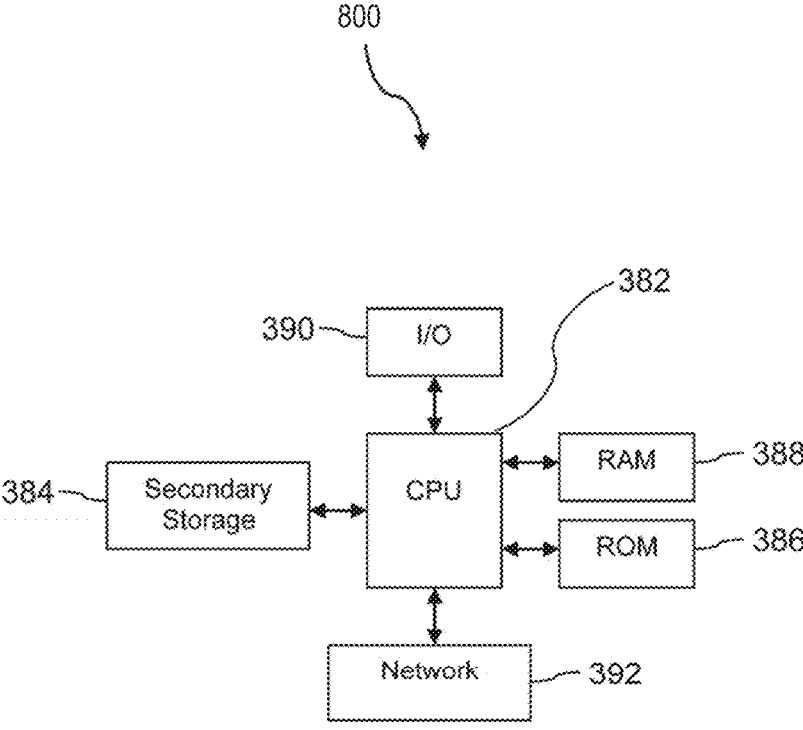
FIG. 8 is a block diagram of a computer system implemented within the communication system of FIG. 1 according to an embodiment of the disclosure.

Referring now to FIG. 5, shown is a method 500 of aerial vehicle routing based on optimal network conditions according to various embodiments of the disclosures. Method 500 may be performed by the application 140 of the aerial vehicle system 106 and, in some cases, the connectivity application 160 of the carrier network system 109. In embodiments, the method 500 may be implemented using a computer system with components as shown in FIG. 8. As illustrated, method 500 of FIG. 5 includes a number of enumerated operations, but embodiments of the operations in FIG. 5 may include additional operations before, after, and in between the enumerated operations.

At step 503, method 500 comprises transmitting, by an application 140 of an aerial vehicle system 106 in the communication network 100, to a carrier network system 109 in the communication network 100, input parameters 146 associated with a requested flight route for a UAV 103. The input parameters 146 include at least one of a current location of the UAV 103, a destination 142, one or more waypoints 145, a location range 148, an altitude 151, or a channel 154.

At step 505, method 500 comprises receiving, by the application 140, signal range data 150 corresponding to a plurality of cell sites 203 based on the input parameters 146. The signal range data 150 for each cell site 203 indicates a three-dimensional distance range within which a signal strength from the cell site 203 is at least a signal strength threshold 179. The three-dimensional distance range comprises a latitude range, a longitude range, and an altitude range.

At step 507, method 500 comprises determining, by the application 140, one or more flight tunnels 253 for the UAV 103 using the signal range data 150. Each of the one or more flight tunnels 253 indicates a three-dimensional tunnel, and the UAV 103 maintains at least the signal strength threshold 179 when the UAV 103 flies within the one or more flight tunnels 253. At step 509, method 500 comprises selecting, by the application 140, a flight tunnel 253 of the one or more flight tunnels 253 based on a signal strength associated with each of the one or more flight tunnels 253 and at least one of airspace regulatory data, ground risk data, terrain data, or weather data (e.g., flight tunnel factors 194). At step 511, method 500 comprises instructing, by the application 140, the UAV 103 to route within the flight tunnel 253 of the one or more flight tunnels 253 to maintain a connection to the carrier network system 109 during flight.

Method 500 may include other steps and/or features that are not otherwise shown in FIG. 5. In an embodiment, method 500 may further comprise receiving, by the application 140, second signal range data 150 corresponding to a second cell site 203 when updated signal range data 150 indicates that signal strength from a first cell site 203 is less than the signal strength threshold 179 and when the first cell site 203 is included in the one or more flight tunnels 253, in which the second signal range data 150 indicates that the signal strength from the second cell site 203 is greater than the signal strength threshold 179, and re-routing, by the application 140, the flight tunnel 253 based on the second signal range data 150. In an embodiment, method 500 may further comprise receiving, by the application 140, feedback data 173 from the UAV 103, in which the feedback data 173 indicates confirmed connectivity data detected by the UAV 103 during flight. In an embodiment, method 500 may further comprise updating, by a connectivity application 160 at the carrier network system 109, signal range data 150 corresponding to one or more of the cell sites 203 based on the feedback data 173. In an embodiment, the signal range data 150 excludes a location of the cell sites 203, and/or the cell sites 203 may be located in a region along a path to the destination 142, proximate to the one or more waypoints 145, or within the location range 148.

Referring now to FIG. 6, shown is a method 600 of aerial vehicle routing based on optimal network conditions according to various embodiments of the disclosures. Method 600 may be performed by the application 140 of the aerial vehicle system 106 and, in some cases, the connectivity application 160 of the carrier network system 109. In embodiments, the method 600 may be implemented using a computer system with components as shown in FIG. 8. As illustrated, method 600 of FIG. 6 includes a number of enumerated operations, but embodiments of the operations in FIG. 6 may include additional operations before, after, and in between the enumerated operations.

At step 603, method 600 comprises transmitting, by an application 140 of an aerial vehicle system 106 in the communication network 100, to a carrier network system 109 in the communication network 100, input parameters 146 associated with a requested flight route for a UAV 103. The input parameters 146 include at least one of a current location of the UAV 103, a destination 142, one or more waypoints 145, a location range 148, an altitude 151, or a channel 154.

At step 605, method 600 comprises identifying, by a connectivity application 160 of the carrier network system 109, one or more cell sites 203 based on the input parameters 146. At step 607, method 600 comprises obtaining, by the connectivity application 160, signal range data 150 corresponding to each of the one or more cell sites 203, in which the signal range data 150 for each of the one or more cell sites 203 indicates a three-dimensional distance range within which a signal strength from a cell site 203 is at least a signal strength threshold, and in which the three-dimensional distance range comprises a latitude range, a longitude range, and an altitude range. At step 609, method 600 comprises transmitting, by the connectivity application 160, the signal range data 150 corresponding to each of the one or more cell sites 203 to the application 140 of the aerial vehicle system 106.

At step 611, method 600 comprises determining, by the application 140 of the aerial vehicle system 106, one or more flight tunnels 235 for the UAV 103 using the signal range data 105, in which each of the one or more flight tunnels 253 indicates a three-dimensional tunnel, and in which the UAV 103 maintains at least the signal strength threshold 179 when the UAV 103 flies within the one or more flight tunnels 253. At step 613, method 600 comprises instructing, by the application 140 of the aerial vehicle system 106, the UAV 103 to route within a flight tunnel 253 of the one or more flight tunnels 253 to maintain a connection to the carrier network system 109 during flight.

At step 615, method 600 comprises obtaining, by the connectivity application 160, updated signal range data 150 associated with a first cell site 203 of the one or more cell sites 203, in which the updated signal range data 150 indicates that the signal strength from the first cell site 203 is less than the signal strength threshold 179. At step 617, method 600 comprises identifying, by the connectivity application 160, a second cell site 203 based on the input parameters 146 when the updated signal range data 150 indicates that the signal strength from the first cell site 203 is less than the signal strength threshold 179 and when the first cell site 203 is included in the one or more flight tunnels 253. At step 619, method 600 comprises transmitting, by the connectivity application 160, second signal range data 150 associated with the second cell site 203 to the application 140 of the aerial vehicle system 106 when the second signal range data 150 indicates that the signal strength from the second cell site 203 is greater than the signal strength threshold 179.

Method 600 may include other steps and/or features that are not otherwise shown in FIG. 6. In an embodiment, method 600 may further comprise receiving, via an input device 141 of the aerial vehicle system 106, the input parameters 146 from an operator of the aerial vehicle system 106. In an embodiment, the one or more cell sites 203 may be located in a region along a path to the destination 142, proximate to the one or more waypoints 145, or within the location range 148. In an embodiment, the signal range data 150 excludes a location of the one or more cell sites 203. In an embodiment, a first flight tunnel 253 of the one or more flight tunnels 253 maintains a first signal strength greater than the signal strength threshold 179, a second flight tunnel 253 of the one or more flight tunnels 253 maintains a second signal strength greater than the signal strength threshold 179, the first signal strength is greater than the second signal strength, and a distance of the first flight tunnel 253 is greater than a distance of the second flight tunnel 253.

In an embodiment, method 600 may further comprise receiving, by the connectivity application 160, UAV data 138 from the UAV 103 during flight, and identifying, by the connectivity application 160, that a source of the UAV data 138 is the UAV 103 based on content of the UAV data 103. In an embodiment, method 600 may further comprise determining, by the connectivity application 160, a network profile 185 associated with the UAV data 138 based on a policy 188, in which the network profile 185 is associated with a network slice in a RAN 163 of the carrier network system 109, and instructing, by the connectivity application 160, one or more network elements in the network slice to forward the UAV data 138. In an embodiment, method 600 may further comprise receiving, by the application 140 of the aerial vehicle system 106, feedback data 173 from the UAV 103, in which the feedback data 173 indicates confirmed connectivity data detected by the UAV 103 during flight.

Figure 7A:
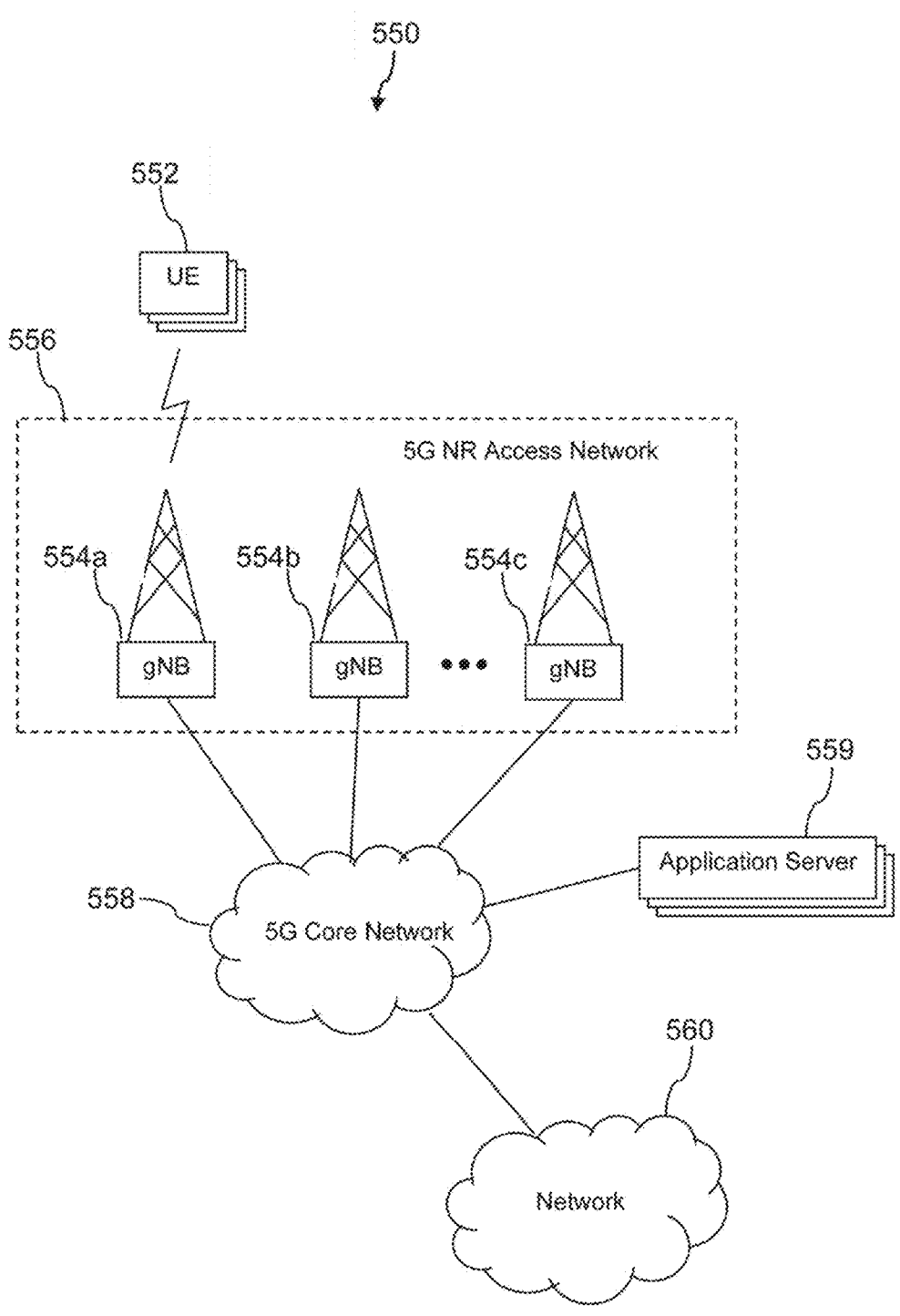
FIGS. 7A and 7B are block diagrams illustrating a communication system similar to the communication system of FIG. 1 according to an embodiment of the disclosure.

Turning now to FIG. 7A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the carrier hotspot device 105, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
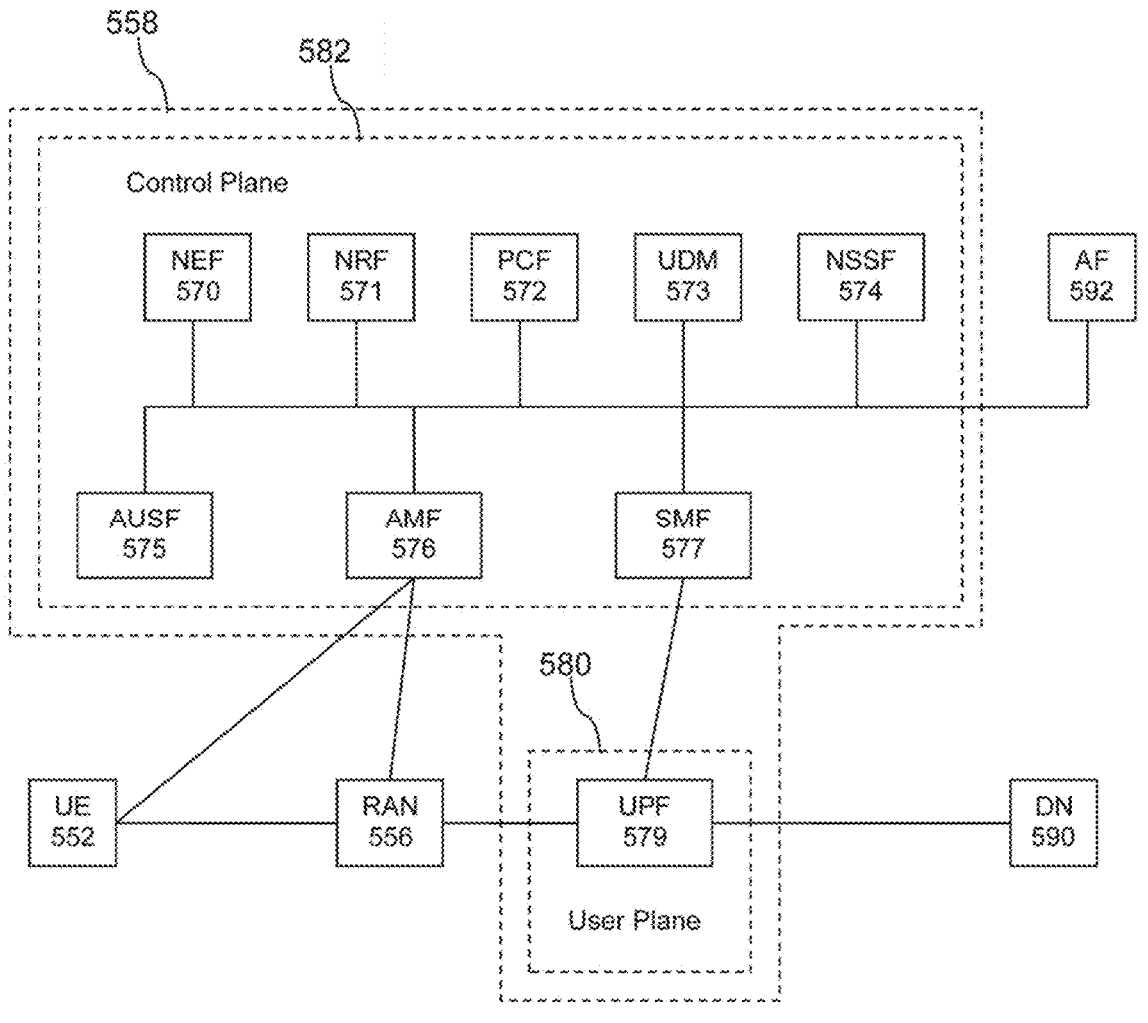

Turning now to FIG. 7B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 7A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

FIG. 8 illustrates a computer system 800 suitable for implementing one or more embodiments disclosed herein. In an embodiment, UAV 103, aerial vehicle system 106, and/or the connectivity application 160 may each be implemented as the computer system 800. The computer system 800 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 800, at least one of the CPU 382, the RAM 388, and the ROM 386 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 800 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 384, to the ROM 386, to the RAM 388, and/or to other nonvolatile memory and volatile memory of the computer system 800. The processor 382 may process the executable instructions and/or data structures in part by directly accessing the computer program product, for example by reading from a CD-ROM disk inserted into a disk drive peripheral of the computer system 800. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 800.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 800 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a communication network for unmanned aerial vehicle routing based on optimal network connections, wherein the method comprises:

transmitting, by an application of an aerial vehicle system in the communication network, to a carrier network system in the communication network, input parameters associated with a requested flight route for an unmanned aerial vehicle, wherein the input parameters include at least one of a current location of the unmanned aerial vehicle, a destination, one or more waypoints, a location range, an altitude, or a channel;

identifying, by a connectivity application of the carrier network system, one or more cell sites based on the input parameters;

obtaining, by the connectivity application, signal range data corresponding to each of the one or more cell sites, wherein the signal range data for each of the one or more cell sites indicates a three-dimensional distance range within which a signal strength from a cell site is at least a signal strength threshold, wherein the three-dimensional distance range comprises a latitude range, a longitude range, and an altitude range;

transmitting, by the connectivity application, the signal range data corresponding to each of the one or more cell sites to the application of the aerial vehicle system;

prior to determining a flight path for the unmanned aerial vehicle, determining, by the application of the aerial vehicle system, one or more flight tunnels for the unmanned aerial vehicle using the signal range data, wherein each of the one or more flight tunnels indicates a three-dimensional tunnel corridor, wherein the unmanned aerial vehicle maintains at least the signal strength threshold when the unmanned aerial vehicle flies within the one or more flight tunnels;

determining, by the application of the aerial vehicle system, using a flight tunnel of the one or more flight tunnels as a constraint, the flight path comprising a plurality of waypoints between the current location and the destination, wherein each waypoint of the plurality of waypoints has a latitude coordinate, a longitude coordinate, and an altitude coordinate that fall within the flight tunnel, wherein the unmanned aerial vehicle maintains at least the signal strength threshold at each waypoint of the plurality of waypoints;

instructing, by the application of the aerial vehicle system, the unmanned aerial vehicle to route along the flight path, wherein the unmanned aerial vehicle maintains a connection to the carrier network system during flight along the flight path;

obtaining, by the connectivity application, updated signal range data associated with a first cell site of the one or more cell sites, wherein the updated signal range data indicates that the signal strength from the first cell site is less than the signal strength threshold;

identifying, by the connectivity application, a second cell site based on the input parameters when the updated signal range data indicates that the signal strength from the first cell site is less than the signal strength threshold and when the first cell site is included in the one or more flight tunnels; and transmitting, by the connectivity application, second signal range data associated with the second cell site to the application of the aerial vehicle system when the second signal range data indicates that the signal strength from the second cell site is greater than the signal strength threshold.

2. The method of claim 1, further comprising receiving, via an input device of the aerial vehicle system, the input parameters from an operator of the aerial vehicle system.

3. The method of claim 1, wherein the one or more cell sites are located in a region along a path to the destination, proximate to the one or more waypoints, or within the location range.

4. The method of claim 1, wherein the signal range data excludes a location of the one or more cell sites.

5. The method of claim 1, wherein a first flight tunnel of the one or more flight tunnels maintains a first signal strength greater than the signal strength threshold, wherein a second flight tunnel of the one or more flight tunnels maintains a second signal strength greater than the signal strength threshold, wherein the first signal strength is greater than the second signal strength, wherein a distance of the first flight tunnel is greater than a distance of the second flight tunnel.

6. The method of claim 1, further comprising:

receiving, by the connectivity application, unmanned aerial vehicle data from the unmanned aerial vehicle during flight; and identifying, by the connectivity application, that a source of the unmanned aerial vehicle data is the unmanned aerial vehicle based on content of the unmanned aerial vehicle data.

7. The method of claim 1, further comprising:

determining, by the connectivity application, a network profile associated with the unmanned aerial vehicle data based on a policy, wherein the network profile is associated with a network slice in a radio access network (RAN) of the carrier network system; and instructing, by the connectivity application, one or more network elements in the network slice to forward the unmanned aerial vehicle data.

8. The method of claim 1, further comprising receiving, by the application of the aerial vehicle system, feedback data from the unmanned aerial vehicle, wherein the feedback data indicates confirmed connectivity data detected by the unmanned aerial vehicle during flight.

9. A method implemented in a communication network for unmanned aerial vehicle routing based on optimal network connections, wherein the method comprises:

transmitting, by an application of an aerial vehicle system in the communication network, to a carrier network system in the communication network, input parameters associated with a requested flight route for an unmanned aerial vehicle, wherein the input parameters include at least one of a current location of the unmanned aerial vehicle, a destination, one or more waypoints, a location range, an altitude, or a channel;

receiving, by the application, signal range data corresponding to a plurality of cell sites based on the input parameters, wherein the signal range data for each cell site indicates a three-dimensional distance range within which a signal strength from the cell site is at least a signal strength threshold, wherein the three-dimensional distance range comprises a latitude range, a longitude range, and an altitude range;

prior to determining a flight path for the unmanned aerial vehicle, determining, by the application, one or more flight tunnels for the unmanned aerial vehicle using the signal range data, wherein each of the one or more flight tunnels indicates a three-dimensional corridor, wherein the unmanned aerial vehicle maintains at least the signal strength threshold when the unmanned aerial vehicle flies within the one or more flight tunnels;

selecting, by the application, a flight tunnel of the one or more flight tunnels based on a signal strength associated with each of the one or more flight tunnels and at least one of airspace regulatory data, ground risk data, terrain data, or weather data;

determining, by the application, using the flight tunnel as a constraint, the flight path comprising a plurality of waypoints between the current location and the destination, wherein each waypoint of the plurality of waypoints has a latitude coordinate, a longitude coordinate, and an altitude coordinate that fall within the flight tunnel, wherein the unmanned aerial vehicle maintains at least the signal strength threshold at each waypoint of the plurality of waypoints; and instructing, by the application, the unmanned aerial vehicle to route along the flight path, wherein the unmanned aerial vehicle maintains a connection to the carrier network system network during flight along the flight path.

10. The method of claim 9, further comprising:

receiving, by the application, second signal range data corresponding to a second cell site when updated signal range data indicates that signal strength from a first cell site is less than the signal strength threshold and when the first cell site is included in the one or more flight tunnels, wherein the second signal range data indicates that the signal strength from the second cell site is greater than the signal strength threshold; and re-routing, by the application, the flight tunnel based on the second signal range data.

11. The method of claim 9, further comprising receiving, by the application, feedback data from the unmanned aerial vehicle, wherein the feedback data indicates confirmed connectivity data detected by the unmanned aerial vehicle during flight.

12. The method of claim 11, further comprising updating, by a connectivity application at the carrier network system, signal range data corresponding to one or more of the cell sites based on the feedback data.

13. The method of claim 9, wherein the signal range data excludes a location of the cell sites.

14. The method of claim 9, wherein the cell sites are located in a region along a path to the destination, proximate to the one or more waypoints, or within the location range.

15. An aerial vehicle system, comprising:

a non-transitory memory;

a processor coupled to the non-transitory memory; and an application stored at the non-transitory memory, which when executed by the processor, causes the processor to be configured to:

transmit, to a carrier network system in the communication network, input parameters associated with a requested flight route for an unmanned aerial vehicle;

receive signal range data corresponding to a plurality of cell sites based on the input parameters;

prior to determining a flight path for the unmanned aerial vehicle, determine one or more flight tunnels for the unmanned aerial vehicle using the signal range data, wherein each of the one or more flight tunnels indicates a three-dimensional corridor, wherein the unmanned aerial vehicle maintains at least a signal strength threshold when the unmanned aerial vehicle flies within the one or more flight tunnels;

select a flight tunnel of the one or more flight tunnels;

determine, using the flight tunnel as a constraint, the flight path comprising a plurality of waypoints, wherein each waypoint of the plurality of waypoints has a latitude coordinate, a longitude coordinate, and an altitude coordinate that fall within the flight tunnel, wherein the unmanned aerial vehicle maintains at least the signal strength threshold at each waypoint of the plurality of waypoints; and instruct the unmanned aerial vehicle to route along the flight path, wherein the unmanned aerial vehicle maintains connectivity during flight along the flight path.

16. The aerial vehicle system of claim 15, wherein the instructions further cause the application to be configured to:

receive second signal range data corresponding to a second cell site when updated signal range data indicates that signal strength from a first cell site is less than the signal strength threshold and when the first cell site is included in the one or more flight tunnels, wherein the second signal range data indicates that the signal strength from the second cell site is greater than the signal strength threshold; and re-route the flight tunnel based on the second signal range data.

17. The aerial vehicle system of claim 16, wherein the instructions further cause the application to be configured to determine whether to re-route the flight tunnel based on application of the updated signal range data to one or more re-route rules.

18. The aerial vehicle system of claim 15, wherein the instructions further cause the application to be configured to receive feedback data from the unmanned aerial vehicle, wherein the feedback data indicates confirmed connectivity data detected by the unmanned aerial vehicle during flight.

19. The aerial vehicle system of claim 15, wherein the one or more cell sites are located in a region along a path to a destination, proximate to one or more waypoints, or within a location range.

20. The aerial vehicle system of claim 15, wherein the signal range data excludes a location of the cell sites, wherein the input parameters include at least one of a current location of the unmanned aerial vehicle, a destination, one or more waypoints, a location range, an altitude, or a channel, wherein the signal range data for each cell site indicates a three-dimensional distance range within which a signal strength from the cell site is at least a signal strength threshold, wherein the three-dimensional distance range comprises a latitude range, a longitude range, and an altitude range.

* * * * *